(12) United States Patent
Sakai et al.

(10) Patent No.: US 10,031,528 B2
(45) Date of Patent: *Jul. 24, 2018

(54) WORK MACHINE CONTROL SYSTEM, WORK MACHINE, AND WORK MACHINE MANAGEMENT SYSTEM

(71) Applicant: Komatsu Ltd., Tokyo (JP)

(72) Inventors: Atsushi Sakai, Tokyo (JP); Masanori Minagawa, Tokyo (JP); Daisuke Tanaka, Tokyo (JP); Mitsuhiro Ryuman, Tokyo (JP); Yosuke Kadono, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/126,446

(22) PCT Filed: Feb. 1, 2016

(86) PCT No.: PCT/JP2016/052940
§ 371 (c)(1),
(2) Date: Sep. 15, 2016

(87) PCT Pub. No.: WO2016/093374
PCT Pub. Date: Jun. 16, 2016

(65) Prior Publication Data
US 2017/0220044 A1    Aug. 3, 2017

(51) Int. Cl.
*G05D 1/02* (2006.01)
(52) U.S. Cl.
CPC ......... *G05D 1/0274* (2013.01); *G05D 1/0219* (2013.01); *G05D 2201/0202* (2013.01)

(58) Field of Classification Search
CPC ............... G05D 1/0274; G05D 1/0219; G05D 2201/0202
(Continued)

(56) References Cited

U.S. PATENT DOCUMENTS

| 6,064,926 A | 5/2000 | Sarangapani et al. |
| 2008/0177449 A1 | 7/2008 | Pickett et al. |

(Continued)

FOREIGN PATENT DOCUMENTS

| JP | 11-242520 A | 9/1999 |
| JP | 2014-203429 A | 10/2014 |

(Continued)

OTHER PUBLICATIONS

Foresti et al., Multisensor Data Fusion for Autonomous Vehicle Navigation in Risky Environments, 2002, IEEE, p. 1165-1185.*

(Continued)

*Primary Examiner* — McDieunel Marc
(74) *Attorney, Agent, or Firm* — Locke Lord LLP

(57) ABSTRACT

A work machine control system is configured to control a work machine that travels on a travel route and includes a position detection unit, a non-contact sensor, and a control unit. The position detection unit detects a position of the work machine. The non-contact sensor detects a position of an object around the work machine. The control unit extracts information on an object to be detected from a detection result of the position detection unit and a detection result of the non-contact sensor, and excludes the information on an object to be detected inside a mask region that is set so as to include a terrain change portion that is a portion in which a terrain changes by use of a machine among portions around the travel route.

12 Claims, 22 Drawing Sheets

(58) Field of Classification Search
USPC .......................................................... 701/50
See application file for complete search history.

(56) References Cited

U.S. PATENT DOCUMENTS

| | | | |
|---|---|---|---|
| 2015/0253776 A1 | 9/2015 | Tojima et al. | |
| 2015/0276416 A1* | 10/2015 | Yamasaki | H04W 4/029 |
| | | | 701/537 |
| 2016/0062357 A1 | 3/2016 | Masaki et al. | |
| 2016/0185346 A1* | 6/2016 | Awamori | G05D 1/0231 |
| | | | 701/23 |
| 2016/0224029 A1 | 8/2016 | Tojima et al. | |
| 2017/0017238 A1* | 1/2017 | Tojima | G01S 13/876 |
| 2017/0031367 A1* | 2/2017 | Tojima | G05D 1/027 |
| 2017/0079195 A1* | 3/2017 | Yokoyama | A01B 69/00 |
| 2017/0122741 A1* | 5/2017 | Sakai | G01S 19/46 |
| 2017/0124862 A1* | 5/2017 | Sakai | G01C 21/26 |
| 2017/0151946 A1* | 6/2017 | Shiga | B60W 30/143 |
| 2017/0153649 A1* | 6/2017 | Ogihara | G05D 1/0268 |
| 2017/0177003 A1* | 6/2017 | Yokoyama | G05D 1/0278 |
| 2017/0192434 A1* | 7/2017 | Kou | G05D 1/0223 |
| 2017/0220042 A1* | 8/2017 | Sakai | G05D 1/0088 |
| 2017/0269591 A1* | 9/2017 | Tanaka | G05D 1/0088 |
| 2017/0278395 A1* | 9/2017 | Hamada | G08G 1/127 |

FOREIGN PATENT DOCUMENTS

| | | |
|---|---|---|
| JP | 5714129 B1 | 5/2015 |
| WO | 2014/156498 A1 | 10/2014 |
| WO | 2015/015575 A1 | 2/2015 |

OTHER PUBLICATIONS

Office Action dated Oct. 26, 2016, issued for the Australian patent application No. 2016204168.
International Search Report dated Mar. 15, 2016, issued for PCT/JP2016/052940.

\* cited by examiner

WORK MACHINE CONTROL SYSTEM, WORK MACHINE, AND WORK MACHINE MANAGEMENT SYSTEM

FIELD

The present invention relates to a work machine control system, a work machine, and a work machine management system.

BACKGROUND

In a mining site in a mine, work machines such as a dump truck disclosed in Patent Literature 1 operate.

CITATION LIST

Patent Literature

Patent Literature 1: JP 11-242520 A

SUMMARY

Technical Problem

In some cases, when an abnormality occurs in the ionosphere, a work machine that autonomously travels on a travel route in a mine might be stopped from operating due to decreased accuracy of a position detected using a global navigation satellite system. As a result, this might decrease productivity in the mine.

An object of the present invention is to provide a work machine control system, a work machine, and a work machine management system capable of suppressing a decrease in productivity in a mine.

Solution to Problem

According to a first aspect of the present invention, a work machine control system configured to control a work machine that travels on a travel route, comprises: a position detection unit configured to detect a position of the work machine; a non-contact sensor configured to detect a position of an object around the work machine; and a control unit configured to extract information on an object to be detected from a detection result of the position detection unit and a detection result of the non-contact sensor and configured to exclude the information on an object to be detected inside a mask region that is set so as to include a terrain change portion that is a portion in which a terrain changes by use of a machine among portions around the travel route.

According to a second aspect of the present invention, a work machine control system configured to control a work machine that travels on a travel route, comprises: a position detection unit configured to detect a position of the work machine; a non-contact sensor configured to detect a position of an object around the work machine; and a measurement output unit configured to execute identification operation that identifies the position of the work machine by matching map information against a detection result of the non-contact sensor, the map information being generated based on a detection result of the position detection unit and the detection result of the non-contact sensor, wherein when the measurement output unit executes the identification operation, the measurement output unit uses the map information from which a position within a predetermined mask region has been excluded.

According to a third aspect of the present invention, a work machine comprises: a work machine main body that travels on a travel route in a mine; and the work machine control system according the first aspect.

According to a fourth aspect of the present invention, a work machine management system, comprises: the work machine according to the second aspect; and a management facility that is provided in a mine and transmits position-related information regarding at least one of a position of a terrain change portion that is a portion in which a terrain changes by use of a machine among portions around the travel route, and a position of the machine, wherein the work machine control system receives the position-related information and sets the mask region based on the received position-related information.

Advantageous Effects of Invention

According to the present invention, it is possible to suppress a decrease in productivity in a mine.

DESCRIPTION OF EMBODIMENTS

Hereinafter, an embodiment of the present invention will be described with reference to the drawings. The present invention is not limited by the present embodiment. In addition, components in the following embodiment include components that a person skilled in the art can easily replace, or that are substantially identical.

<Outline of Work Machine Management System>

Figure 1:
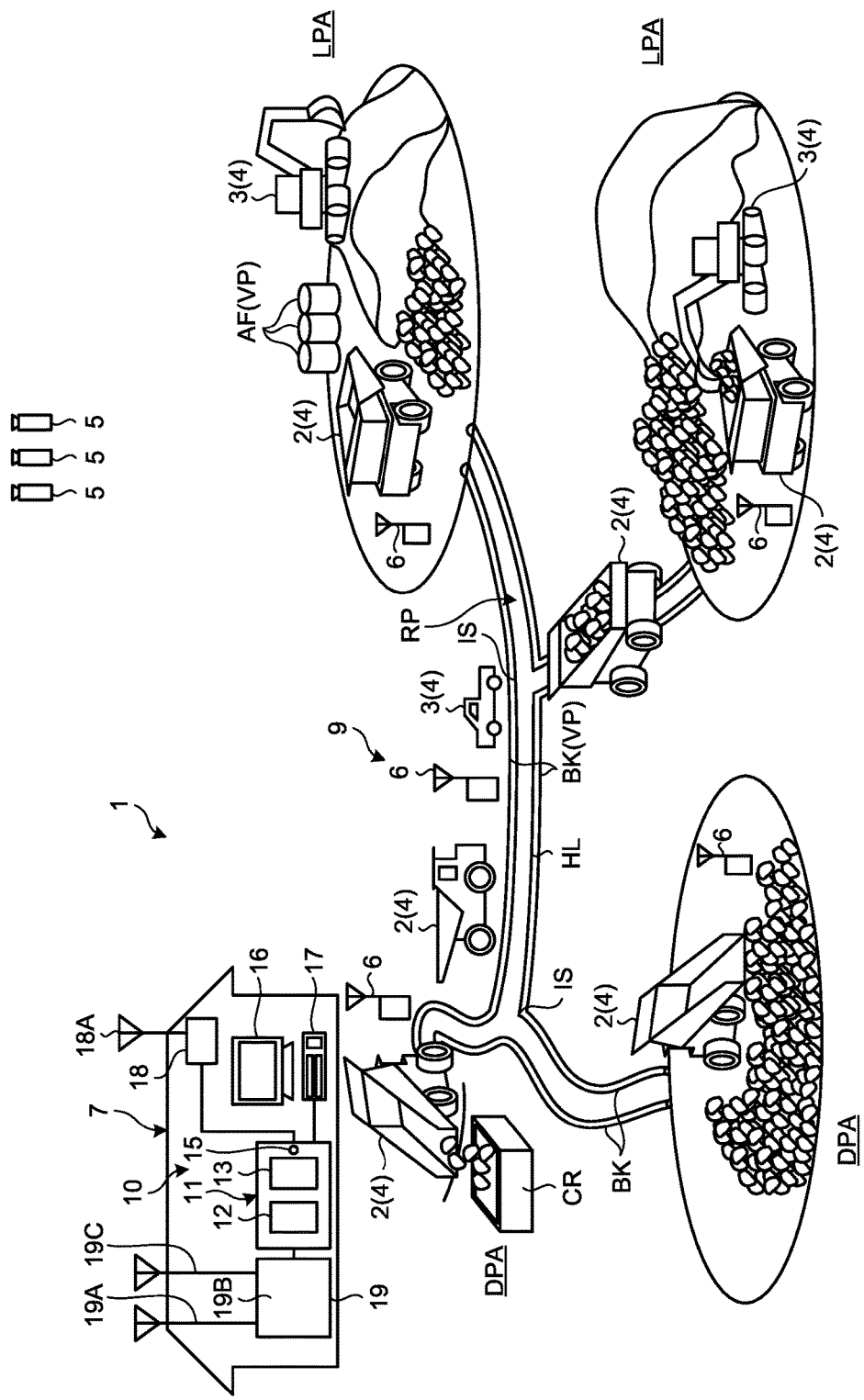
FIG. 1 is an exemplary work machine management system according to a first embodiment.
Figure 2:
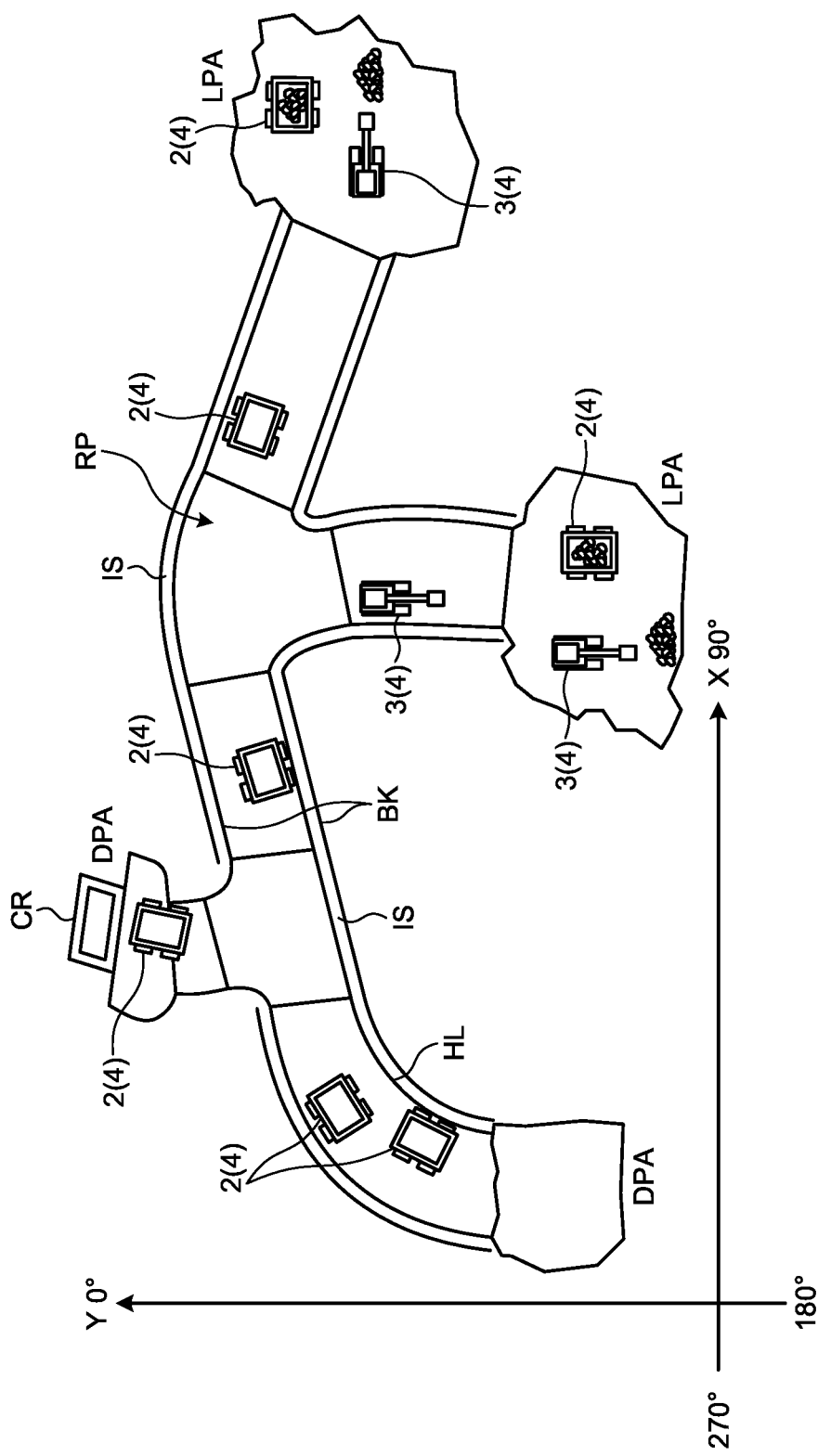
FIG. 2 is a plan view illustrating an exemplary mine to which the work machine management system according to the first embodiment is applied.

FIG. 1 is an exemplary work machine management system according to the present embodiment. FIG. 2 is a plan view illustrating an exemplary mine to which the work machine management system according to the present embodiment and a work machine management system 1 are applied.

The work machine management system 1 (hereinafter, referred to as a management system) performs work machine management. The work machine management includes at least one of work machine operation management, work machine productivity evaluation, operation skill evaluation of work machine operators, maintenance of work machines, and work machine failure diagnosis.

The work machine represents machinery used for various operation in a mine. The work machine includes at least one of a boring machine, an excavating machine, a loading machine, a transport machine, a crushing machine, and a vehicle driven by an operator. The excavating machine can excavate a mine. The loading machine can load a load onto the transport machine. The loading machine includes at least one of an excavator, an electric shovel, and a wheel loader. The transport machine includes a moving object that can move in a mine and transport a load. The transport machine includes a dump truck. The load includes at least one of soil or ore generated by mining. The crushing machine crushes dumped soil casted from the transport machine.

An example in which the transport machine as a work machine that travels in a mine is managed by the management system 1, and an example in which a dump truck 2 as a work machine is controlled by the management system 1, according to the present embodiment, will be described. The dump truck 2, as illustrated in FIGS. 1 and 2, operates in a mine at at least one of a loading location LPA, a dumping location DPA, a transportation path HL leading to at least one of the loading location LPA and the dumping location DPA, and an intersection IS at which the transportation paths HL intersect each other. In some cases, a crushing machine CR that crushes the dumped soil is arranged at at least one of the dumping locations DPA. In a mine, a bank BK formed with piled-up soil is provided on at least one of the outside of the loading location LPA, the outside of the dumping location DPA, and the outside of the transportation path HL.

The dump truck 2 is a moving object that can move in a mine. The dump truck 2 can travel on at least one of the loading location LPA, the dumping location DPA, the transportation path HL, and the intersection IS. That is, a travel route RP of the dump truck 2, provided in a mine, includes at least one of the loading location LPA, the dumping location DPA, the transportation path HL, and the intersection IS. A mine is provided with an upwardly protruding object VP protruding upwardly from a surface of an operation region of the dump truck 2 by a predetermined height or more. According to the first embodiment, the upwardly protruding object VP is formed with a bank BK provided outside of the travel route RP, an artificial object AF installed in at least one of the loading location LPA, the dumping location DPA, and the transportation path HL, and a wall WL installed in at least one of the loading location LPA, the dumping location DPA, and the transportation path HL. In addition to this, an artificial object such as a sign and a building, and a rock, may be included in the upwardly protruding object VP. The predetermined height is a height at which it is undesirable for the dump truck 2 to run over the upwardly protruding object VP at a time of autonomous travel.

A load is loaded onto the dump truck 2 in the loading location LPA. The dump truck 2 unloads (dumps) the load at the dumping location DPA. The dump truck 2 casts dumped soil as a load into the crushing machine CR at the dumping location DPA provided with the crushing machine CR. The dump truck 2 is an unmanned dump truck that normally travels autonomously during operation time of a mine on the travel route RP according to a command signal from a management device 10. Autonomous travel of the dump truck 2 means that the dump truck 2 travels according to the command signal from the management device 10, not by operation of an operator. Alternatively, the dump truck 2 can also travel by operation of the operator (driver).

As illustrated in FIG. 1, the management system 1 includes the management device 10, a communication system 9, the dump truck 2, and other work machine 3. The management device 10 is arranged in a management facility 7 installed in a mine. The management device 10 is installed in the management facility 7 in a mine and does not move. Alternatively, the management device 10 may be configured to be movable. The communication system 9 transmits information among the management device 10, the dump truck 2, and the other work machine 3 by wireless communication. The communication system 9 enables two-way wireless communication between the management device 10 and the dump truck 2, between the management device 10 and the other work machine 3, and between the dump truck 2 the other work machine 3. According to the present embodiment, the communication system 9 includes a plurality of relays 6 that relays signals (radio waves).

According to the present embodiment, a position of the dump truck 2 and a position of the other work machine 3 are detected by using a real time kinematic-global navigation satellite system (RTK-GNSS). An exemplary global navigation satellite system includes a global positioning system (GPS). The configuration, however, is not limited to this. The RTK-GNSS includes a plurality of positioning satellites 5. The RTK-GNSS detects a position in a coordinate system (global coordinate system) that defines longitude, latitude, and altitude. The position detected by the RTK-GNSS includes coordinate information of longitude, latitude, and altitude. The RTK-GNSS is used to detect a position of the dump truck 2 and a position of the other work machine 3, in the mine. The position detected by the RTK-GNSS is an absolute position defined in the global coordinate system. In the description below, the position detected by the RTK-GNSS will be referred to as a GPS position, as appropriate. The GPS position is an absolute position and coordinate information (coordinate value) of longitude, latitude, and altitude. In the RTK-GNSS, positioning modes change according to influences from arrangement of the positioning satellite 5, the ionosphere, the troposphere, or terrain around an antenna that receives information from the positioning satellite 5. The positioning modes include a fixed solution (accuracy: approximately ±1 cm to 2 cm), a float solution (accuracy: approximately ±10 cm to several meters), a single-point positioning solution (accuracy: approximately ±several meters), and non-positioning (positioning calculation not possible).

Moreover, the management system 1 manages the positions of the dump truck 2 and the other work machine 3, in a mine, by a coordinate system defined by the X-axis direction and the Y-axis direction orthogonal to each other (hereinafter, referred to as the X-Y coordinates) as illustrated in FIG. 2. The management system 1 also manages the azimuth of the dump truck 2 and the other work machine 3 as north: 0°, east: 90°, south: 180°, and west: 270°. The azimuth of each of the dump truck 2 and the other work machine 3 is defined as a direction in which each of the dump truck 2 and the other work machine 3 moves when traveling forwardly. Note that, although the Y-axis direction indicates north in the present embodiment. The configuration, however, is not limited to this.

<Management Device>

Next, the management device 10 arranged in the management facility 7 will be described. The management device 10 transmits travel route information that is information to specify the travel route RP provided in a mine, to a work machine control system 30 of the dump truck 2 and includes, as illustrated in FIG. 1, a computer 11, a display device 16, an input device 17, a wireless communication device 18, and a GPS base station 19.

The computer 11 includes a processing device 12, a storage device 13, and an input/output unit 15. Each of the display device 16, the input device 17, the wireless communication device 18, and the GPS base station 19 is connected to the computer 11 via the input/output unit 15. The input/output unit 15 is used for performing input/output (interface) of information with at least one of the processing device 12, the display device 16, the input device 17, the wireless communication device 18, and the GPS base station 19.

The processing device 12 executes various types of processing related to management of the dump truck 2 and various types of processing related to management of the other work machine 3. The processing device 12 processes information regarding the position of the dump truck 2 and information regarding the position of the other work machine 3, obtained via the communication system 9. The processing device 12 generates travel route information on the dump truck 2. The storage device 13 is connected with the processing device 12. The storage device 13 stores various types of information regarding management of the dump truck 2 and various types of information regarding management of the other work machine 3. The storage device 13 stores a position of the dump truck 2 and a position of the other work machine 3. The storage device 13 stores a computer program that causes the processing device 12 to execute various types of processing.

The display device 16 includes a flat panel display such as a liquid crystal display. The display device 16 can display information regarding the position of the dump truck 2 and information regarding the position of the other work machine 3. The input device 17 includes at least one of a keyboard, a touch panel, and a mouse. The input device 17 functions as an operation unit that can be used to input an operation signal into the processing device 12.

The wireless communication device 18 is arranged in the management facility 7. The wireless communication device 18 is a portion of the communication system 9. The wireless communication device 18 is connected with the processing device 12 via the input/output unit 15. The wireless communication device 18 includes an antenna 18A. The wireless communication device 18 can receive information transmitted from at least one of the dump truck 2 and the other work machine 3. The information received by the wireless communication device 18 is output to the processing device 12 and stored (registered) in the storage device 13. The wireless communication device 18 can transmit information to at least one of the dump truck 2 and the other work machine 3. The wireless communication device 18 can transmit position information on a moving object (moving object position information) of each of the dump truck 2 and the other work machine 3. The moving object position information includes, for example, coordinate information regarding the above-described X-coordinate and Y-coordinate.

The GPS base station 19 is arranged in the management facility 7. The GPS base station 19 includes at least an antenna 19A that receives information from the plurality of positioning satellites 5 and a transmission/reception device 19B connected to the antenna 19A. The transmission/reception device 19B includes at least a receiver that receives information from the positioning satellite 5 via the antenna 19A, a transmitter that transmits information to the dump truck 2 via an antenna 19C, a calculation processing device including a microprocessor such as a central processing unit (CPU), and a storage device including a memory such as a read only memory (ROM) or a random access memory (RAM). The transmission/reception device 19B detects the GPS position of the GPS base station 19 based on the information received by the antenna 19A, and together with this, generates correction observation information used to correct the GPS position of the dump truck 2. At the GPS base station 19, the transmission/reception device 19B transmits correction observation information to the dump truck 2 and the other work machine 3 via the antenna 19C. Alternatively, the GPS base station 19 may transmit the correction observation information via the antenna 18A instead of the antenna 19C.

The computer 11 includes at least the input/output unit 15 for communication, a central processing unit (CPU) that executes a control program, a read only memory (ROM) that stores a control program, a random access memory (RAM) used for CPU operation region, and a nonvolatile memory on which information is registered by the CPU. Functions of the processing device 12 are implemented by procedures executed by the CPU of reading a control program stored in the ROM and executing the control program in the operation region of the RAM. Functions of the storage device 13 are implemented by procedures by the ROM of storing the control program and procedures by the CPU of registering information on the nonvolatile memory. The nonvolatile memory includes at least one of a flash memory and a hard disk drive and is used to implement a database 13B. It is possible to configure such that a plurality of processing circuits works in cooperation to implement functions of the processing device 12 and the storage device 13.

<Other Work Machine>

Next, the other work machine 3 will be described. According to the present embodiment, the other work machine 3 is a work machine other than the dump truck 2 and operates according to operation of an operator. The other work machine 3 includes at least a processing device that contains a central processing unit (CPU) and executes various types of processing related to operation, a GPS receiver that detects a GPS position, a wireless communication device that exchanges information with the wireless communication device 18 of the management facility 7. On the other work machine 3, the wireless communication device transmits a GPS position, with a predetermined time interval, to the wireless communication device 18 of the management facility 7.

<Dump Truck>

Figure 3:
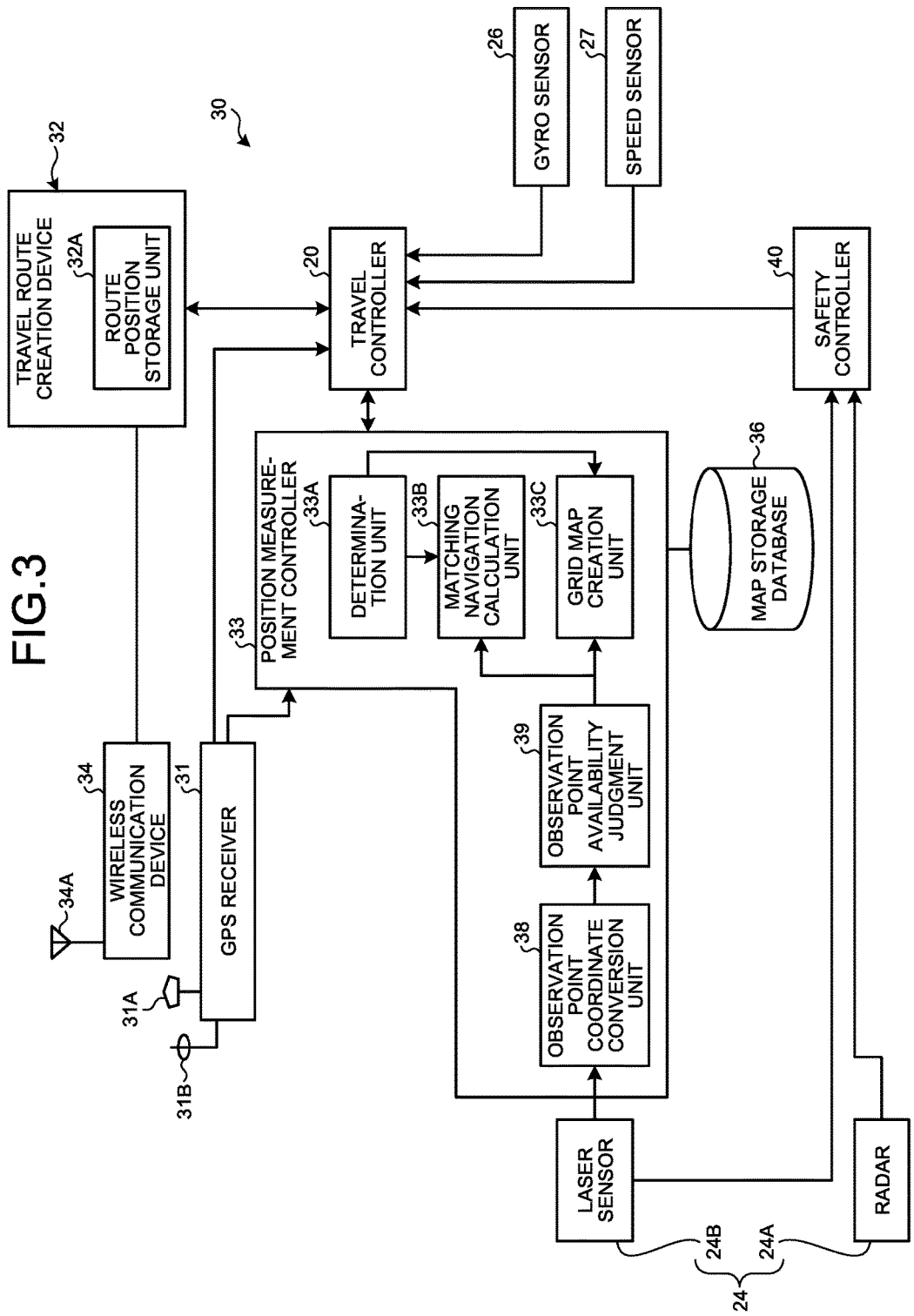
FIG. 3 is a control block diagram of a dump truck according to the first embodiment.
Figure 4:
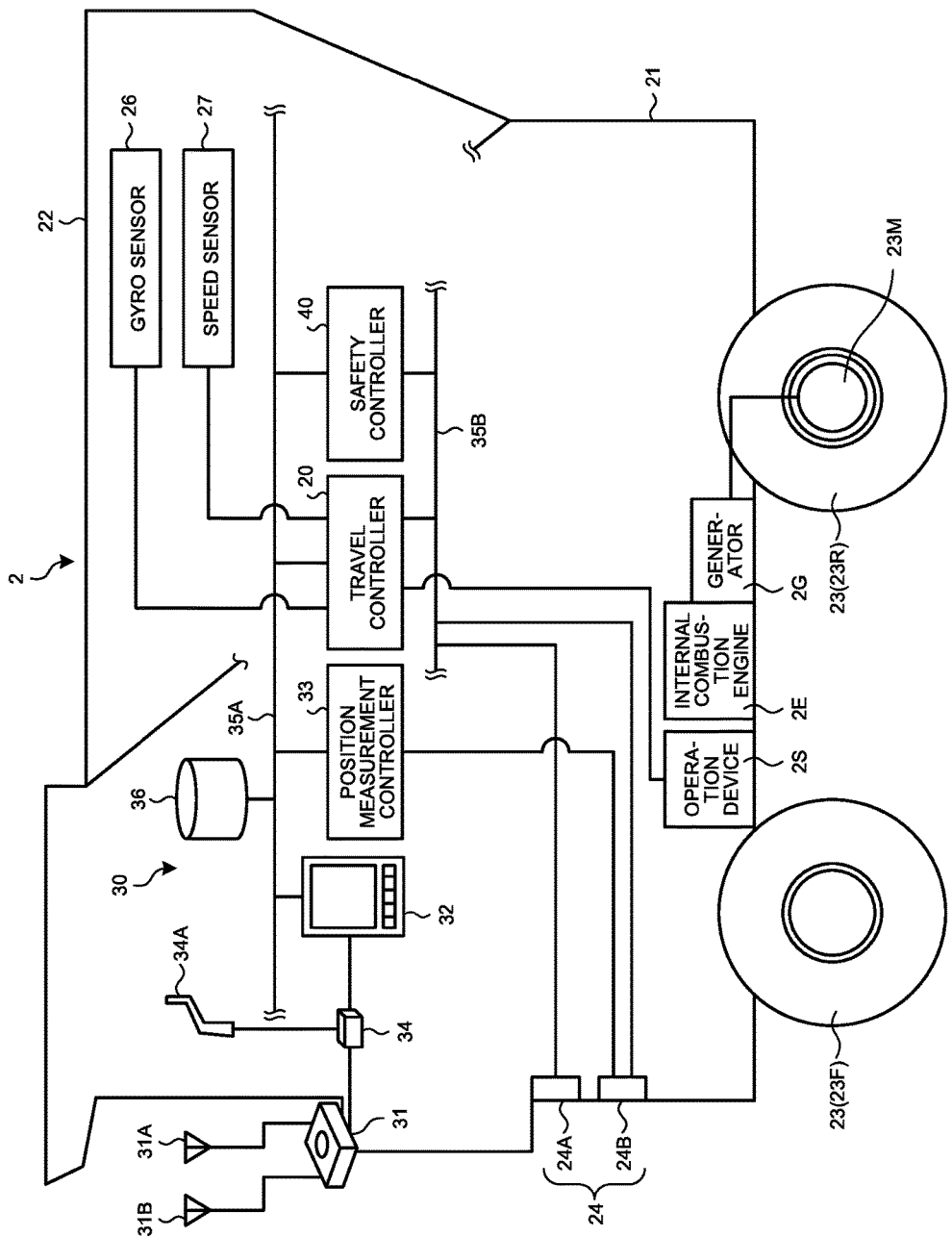
FIG. 4 is a hardware configuration diagram of the dump truck according to the first embodiment.
Figure 5:
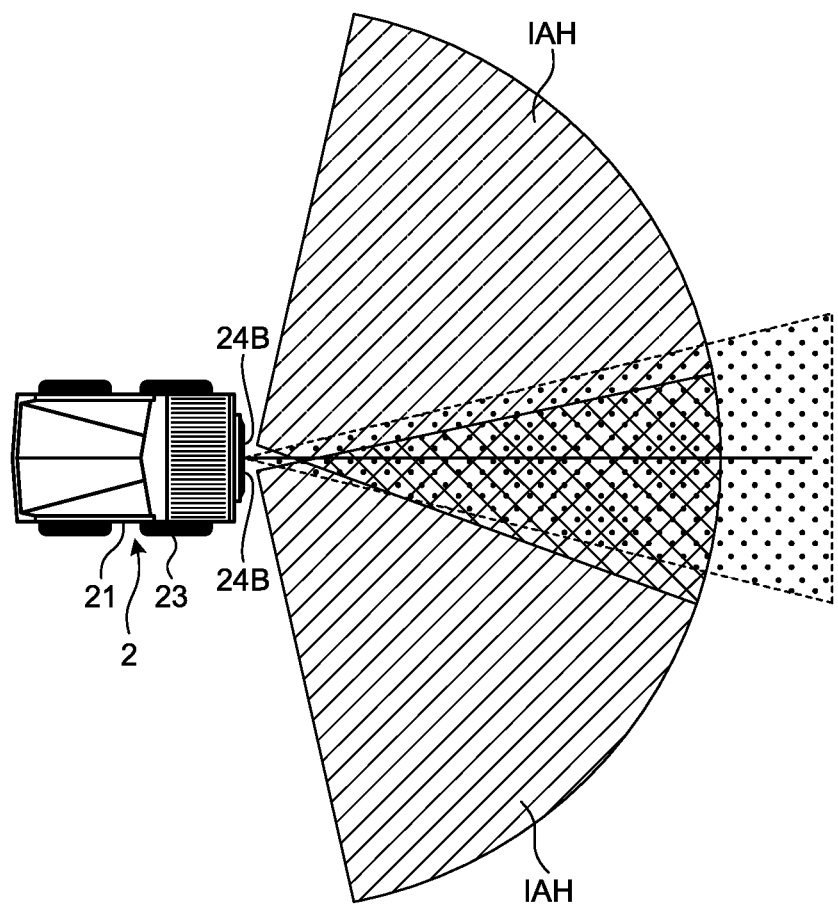
FIG. 5 is a plan view of a laser sensor detection range of an obstacle sensor according to the first embodiment.

Next, the dump truck 2 will be described. FIG. 3 is a control block diagram of the dump truck according to the present embodiment. FIG. 4 is a hardware configuration diagram of the dump truck according to the present embodiment. FIG. 5 is a plan view of a laser sensor detection range of an obstacle sensor according to the present embodiment.

As illustrated in FIG. 4, the dump truck 2 includes a vehicle main body 21, a vessel 22, a wheel 23, an obstacle sensor 24, and the work machine control system 30. The vehicle main body 21 travels on an operation region including the travel route RP. The operation region is a region that includes the transportation path HL, the loading location LPA, the dumping location DPA, and the intersection. The dump truck 2 passes through the operation region when it travels and performs operation. In the vehicle main body 21, an internal combustion engine 2E similar to a diesel engine, a generator 2G activated by the internal combustion engine 2E, an electric motor 23M activated by power generated by the generator are arranged. The electric motor 23M drives a rear wheel 23R of the wheel 23. It is possible to configure such that power of the internal combustion engine 2E is transmitted to the rear wheel 23R via a transmission including a torque converter. The vehicle main body 21 includes an operation device 2S that steers a front wheel 23F of the wheel 23. A load is loaded onto the vessel 22 by a loading machine. At dumping operation, the vessel 22 is raised to dump the load.

The obstacle sensor 24 is arranged at a lower front portion of the vehicle main body 21. The obstacle sensor 24 executes non-contact detection of an obstacle in front of the vehicle main body 21. According to the present embodiment, the obstacle sensor 24 includes a plurality of radars 24A, and a laser sensor 24B as a non-contact sensor. The radar 24A emits a radio wave to be projected toward an obstacle, and then, receives a radio wave reflected from the obstacle. With this function, the radar 24A can detect a direction and distance of the obstacle with respect to the radar 24A. According to the present embodiment, three radars 24A are provided with an interval therebetween in a lateral direction of the vehicle main body 21. The arrangement, however, is not limited to this.

The laser sensor 24B detects a position of an object around the dump truck 2. The laser sensor 24B emits a laser beam to be projected toward an obstacle, namely, an object, and receives a laser beam reflected from the obstacle. With this configuration, the laser sensor 24B can detect a direction and distance of the obstacle with respect to the laser sensor 24B. The laser sensor 24B emits a laser beam and receives a reflected laser beam. Accordingly, the resolution of the laser sensor 24B is higher than the resolution of the radar 24A. According to the present embodiment, two laser sensors 24B are provided with an interval therebetween in a lateral direction of the vehicle main body 21. The arrangement, however, is not limited to this.

Each of the radar 24A and the laser sensor 24B is connected to a second communication line 35B of the work machine control system 30. The laser sensor 24B is connected to a position measurement controller 33 of the work machine control system 30.

<Work Machine Control System>

Figure 6:
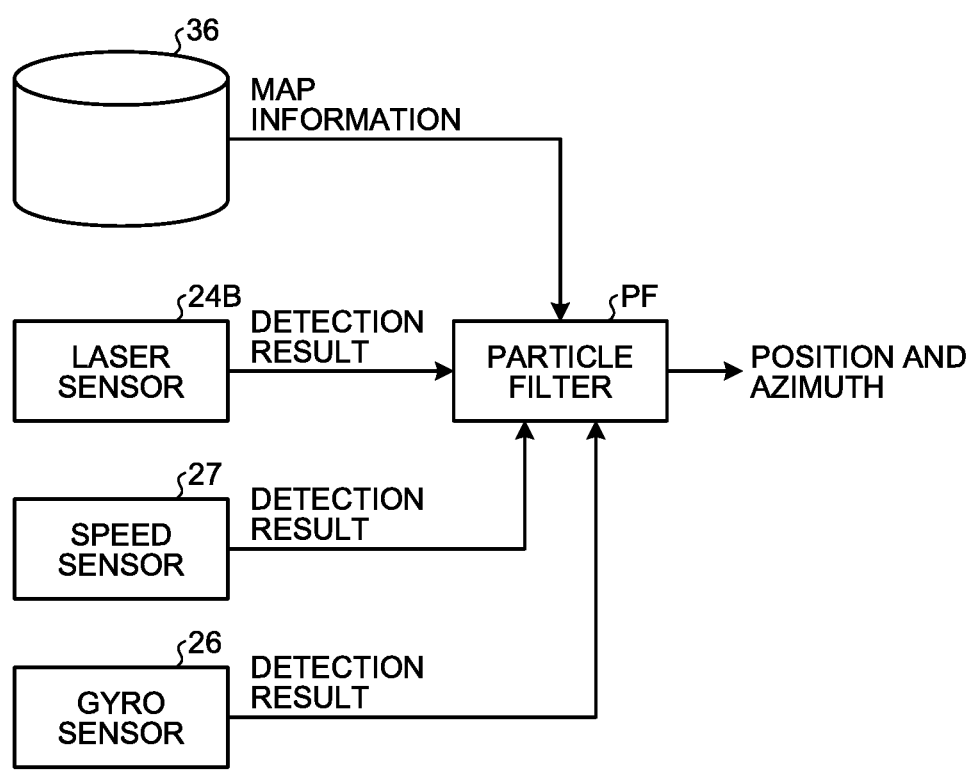
FIG. 6 is a diagram illustrating a method of detecting a position and an azimuth by a matching navigation position calculation unit of a position measurement controller of a work machine control system according to the first embodiment.
Figure 7:
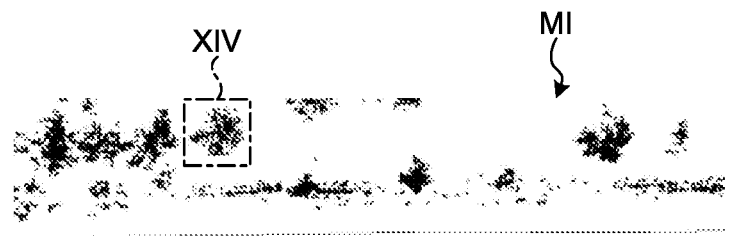
FIG. 7 is a diagram illustrating a portion of map information stored in a map storage database of the work machine control system according to the first embodiment.
Figure 7:
Figure 8:
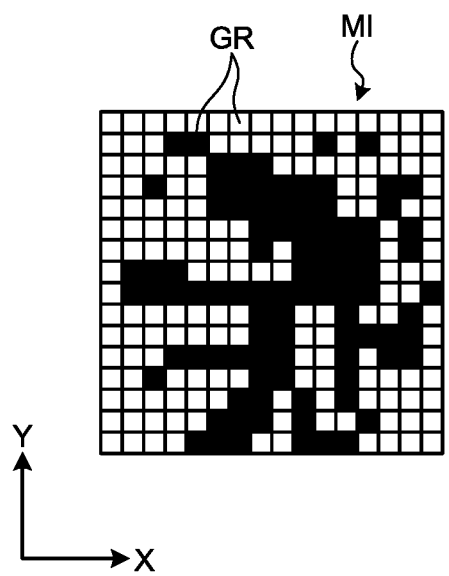
FIG. 8 is an enlarged diagram of a section XIV in FIG. 7.

Next, the work machine control system will be described. FIG. 6 is a diagram illustrating a method of detecting a position and an azimuth by a matching navigation position calculation unit of a position measurement controller of a work machine control system according to the present embodiment. FIG. 7 is a diagram illustrating a portion of map information stored in a map storage database of the work machine control system according to the present embodiment. FIG. 8 is an enlarged diagram of a section XIV in FIG. 7.

The work machine control system 30 is a system installed on the dump truck 2 and causes the dump truck 2 to autonomously travel along the travel route RP. As illustrated in FIG. 4, the work machine control system 30 includes at least a gyro sensor 26, a speed sensor 27, a GPS receiver 31, a travel route creation device 32, the position measurement controller 33, a travel controller 20, the laser sensor 24B, a wireless communication device 34, and a map storage database 36. Additionally, the work machine control system 30 includes a first communication line 35A, the second communication line 35B, and a safety controller 40.

As illustrated in FIG. 4, each of the travel controller 20, the travel route creation device 32, the position measurement controller 33, the map storage database 36, and the safety controller 40 is connected to the first communication line 35A. These communicate with each other to exchange information via a first communication line 35. The travel controller 20 and the safety controller 40 are also connected to the second communication line 35B. These communicate with each other to exchange information via the second communication line 35B. According to the first embodiment, a communication standard using the first communication line 35A and the second communication line 35B is a controller area network (CAN) standardized as ISO11898 and ISO11519. The configuration, however, is not limited to this.

The gyro sensor 26 detects the azimuth (change amount of azimuth) of the dump truck 2. The gyro sensor 26 is connected with the travel controller 20. The gyro sensor 26 outputs a detection signal as a detection result to the travel controller 20. The travel controller 20 can obtain the azimuth (change amount of azimuth) of the dump truck 2 based on the detection signal of the gyro sensor 26.

The speed sensor 27 detects a travel speed of the dump truck 2. According to the present embodiment, the speed sensor 27 detects a rotational speed of the wheel 23 to detect a speed (travel speed) of the dump truck 2. The speed sensor 27 is connected with the travel controller 20. The speed sensor 27 outputs a detection signal as a detection result to the travel controller 20. The travel controller 20 can obtain a moving distance of the dump truck 2 based on the detection signal of the speed sensor 27, time information from a timer built in the travel controller 20.

The GPS receiver 31 is a position detection unit to detect a GPS position as a position of the dump truck 2 by using a GPS. The GPS receiver 31 is connected at least with an antenna 31A that receives information from the positioning satellite 5 and an antenna 31B that receives correction observation information from the GPS base station 19. The antenna 31A outputs a signal based on the information received from the positioning satellite 5 to the GPS receiver 31, and the antenna 31B outputs a signal based on the received correction observation information to the GPS receiver 31. The GPS receiver 31 detects a position of the antenna 31A (GPS position) using information from the positioning satellite 5 and using the correction observation information from the GPS base station 19. Specifically, the GPS receiver 31 compares the information from the positioning satellite 5 with the correction observation information from the GPS base station 19 to obtain a distance to any of the positioning satellites 5, and further examines a phase of a radio wave from the positioning satellite 5 to detect the position (GPS position) of the antenna 31A. According to the present embodiment, the GPS receiver 31 uses a real time kinematic (RTK)-GNSS. The configuration, however, is not limited to this.

The GPS receiver 31 detects the position of the dump truck 2 (GPS position) by detecting the position of the antenna 31A (GPS position). Furthermore, in a process of detecting the position of the antenna 31A, the GPS receiver 31 detects a fixed solution, a float solution, or a single-point positioning solution, each indicating accuracy of the detected GPS position, based on the number of positioning satellites 5, or the like, from which the antenna 31A has received information. In a case where positioning calculation of the GPS position is not possible, the GPS receiver 31 outputs a signal indicating non-positioning. According to the present embodiment, the accuracy of the GPS position by the fixed solution is accuracy with which the dump truck 2 can perform autonomous travel. The accuracies of the GPS positions by the float solution and by the single-point positioning solution are accuracies with which the dump truck 2 cannot perform autonomous travel. The configuration, however, is not limited to this. In this manner, the GPS receiver 31 detects a fixed solution, a float solution, or a single-point positioning solution, indicating accuracies of the detected GPS position, and in a case where it is not possible to execute positioning calculation, outputs a signal indicating non-positioning, to the travel controller 20 and the position measurement controller 33 via the travel route creation device 32.

The travel route creation device 32, as illustrated in FIG. 3, includes a route position storage unit 32A as a route position storage means for storing travel route information generated by the processing device 12 of the management device 10. The travel route creation device 32 is connected with the wireless communication device 34 connected with an antenna 34A. The wireless communication device 34 can receive information (including command signal) transmitted from at least one of the management device 10 and a work machine 4 other than the own vehicle. The work machine 4 other than the own vehicle is the work machine 4 other than the dump truck 2 on which the work machine control system 30 is installed, and includes a boring machine, an excavating machine, a loading machine, a transport machine, and a vehicle driven by an operator. That is, the work machine 4 other than the own vehicle includes a dump truck 2 other than the own vehicle.

The wireless communication device 34 receives the travel route information and information regarding the position of the work machine 4 other than the own vehicle, transmitted by the wireless communication device 18 of the management facility 7, and outputs the information to the travel route creation device 32 and the position measurement controller 33. Note that the travel route information and the information regarding the position of the work machine 4 other than the own vehicle are displayed on the X-Y coordinates. The travel route creation device 32, after receiving the travel route information and the information regarding the position of the work machine 4 other than the own vehicle from the wireless communication device 34, stores the information in the route position storage unit 32A. The travel route creation device 32, after receiving the travel route information and the information regarding the position of the work machine 4 other than the own vehicle, from the wireless communication device 34, transmits the position and azimuth of the dump truck 2 as the own vehicle, to the wireless communication device 18 of the management facility 7 via the wireless communication device 34. The travel route creation device 32 is connected to the first communication line 35A.

The travel controller 20 is a computer including at least a central processing unit (CPU), a read only memory (ROM) that stores a control program, a random access memory (RAM) used as a CPU operation region, and a nonvolatile memory. The travel controller 20 receives the GPS position detected by the GPS receiver 31 and the position of the dump truck 2 detected by the position measurement controller 33. The travel controller 20 is a travel control unit that causes the dump truck 2 to autonomously travel along the travel route RP based on the GPS position of the dump truck 2 detected by the GPS receiver 31 or the position of the dump truck 2 detected by a matching navigation position calculation unit 33B of the position measurement controller 33.

The travel controller 20 performs identification operation to identify the position and azimuth of the dump truck 2 based on the GPS position as a detection result of the GPS receiver 31, the travel speed of the dump truck 2 as a detection result of the speed sensor 27, and the azimuth (change amount of azimuth) of the dump truck 2 as a detection result of the gyro sensor 26. According to the first embodiment, the travel controller 20 integrates, using the Kalman filter (KF), the GPS position as a detection result of the GPS receiver 31, the travel speed of the dump truck 2 as a detection result of the speed sensor 27, and the azimuth (change amount of azimuth) of the dump truck 2 as a detection result of the gyro sensor 26 so as to identify the position and azimuth of the dump truck 2. Specifically, the travel controller 20 uses the GPS position at the time of GPS position input from the GPS receiver 31 and the azimuth, which is a detection result of the gyro sensor 26, as a basis and integrates the travel speed, which is a detection result of the speed sensor 27, by time information from the timer so as to identify the position and the azimuth. The travel controller 20 converts the GPS position into a position on the X-Y coordinates at any of the timings of before detection, during detection, and after detection of the position and the azimuth.

The travel controller 20 controls at least one of an accelerator, a braking device, and the operation device 2S of the dump truck 2 such that the position of the dump truck 2 overlaps with the position of the travel route RP included in the travel route information, that is, such that the dump truck 2 travels along the travel route RP. With this control, the travel controller 20 causes the dump truck 2 to travel along the travel route RP. Functions of the travel controller 20 are implemented when the CPU reads a control program stored in the ROM and executes in the operation region in the RAM. It is possible to configure such that a plurality of processing circuits operates in cooperation to implement functions of the travel controller 20.

The position measurement controller 33, as illustrated in FIG. 3, includes a determination unit 33A, the matching navigation position calculation unit 33B, and a grid map creation unit 33C. The position measurement controller 33 is a measurement output unit that, when the dump truck 2 travels along the travel route RP, detects the position of the upwardly protruding object VP (mainly the bank BK according to the first embodiment) from the GPS position of the dump truck 2, which is the detection result of the GPS receiver 31, and from the detection result of the laser sensor 24B, and stores the presence/absence and the position of the detected upwardly protruding object VP into the map storage database 36 as map information MI of the operation region including the travel route RP. The position measurement controller 33 is connected to the first communication line 35. A detection signal indicating the azimuth (change amount of azimuth) of the dump truck 2, which is a detection result of the gyro sensor 26, and a detection signal indicating the travel speed of the dump truck 2, which is a detection result of the speed sensor 27, are input into the position measurement controller 33 via the first communication line 35 and the travel controller 20.

The position measurement controller 33 is connected with the GPS receiver 31 via the wireless communication device 34, the travel route creation device 32, and the first communication line 35A. A detection signal indicating a GPS position, which is a detection result of the GPS receiver 31, is input into the position measurement controller 33.

The determination unit 33A is a determination means that determines whether GPS positional accuracy detected by the GPS receiver 31 is above a predetermined accuracy (namely, whether it is high accuracy). According to the present embodiment, the determination unit 33A determines whether the solution of the GPS position is a fixed solution. In a case where the solution of the GPS position is a fixed solution, the determination unit 33A determines that the detected GPS positional accuracy of the dump truck 2 is high. In a case where the solution of the GPS position is a float solution, single-point positioning solution, or where the GPS position indicates non-positioning, the determination unit 33A determines that the detected GPS positional accuracy of the dump truck 2 is low. Note that the predetermined accuracy is a GPS positional accuracy that enables autonomous travel of the dump truck 2 along the travel route RP according to dead-reckoning navigation to be described below. According to the present embodiment, the GPS receiver 31 detects GPS position and solution. However, detection of the solution may be performed by another device (determination unit 33A, for example).

The grid map creation unit 33C creates map information of the operation region. The grid map creation unit 33C creates the above-described map information MI in a case where, for example, the determination unit 33A determines that the GPS positional accuracy of the dump truck 2 detected by the GPS receiver 31 is above a predetermined accuracy (namely, high accuracy).

The grid map creation unit 33C first executes extraction operation to extract the position of the upwardly protruding object VP from detected information detected by the laser sensor 24B. When executing the extraction operation, the grid map creation unit 33C first integrates the position and azimuth of the dump truck 2, detected by the determination unit 33A, with the detected information detected by the laser sensor 24B. Subsequently, a detection result for other than the upwardly protruding object VP is deleted so as to extract information on an object to be detected of the upwardly protruding object VP.

The grid map creation unit 33C executes map information generation operation based on the information on an object to be detected extracted in the above-described manner. When executing the generation operation, the grid map creation unit 33C stores, for example, the above-described information on an object to be detected into the map storage database 36 as map information MI of the operation region.

As illustrated in FIG. 7, the map information MI indicates the presence/absence and position of the upwardly protruding portion VP, such as a bank BK, in an operation region of a mine in a plan view. As illustrated in FIG. 8, the map information MI is formed of rectangular grid regions GR arranged in a latticed pattern in X and Y directions. Each of the grid regions GR corresponds to a rectangular region of a mine in a plan view. The X coordinate and Y coordinate are set to each of grid regions GR. Each of the grid regions GR includes information of whether the upwardly protruding object VP exists or not, namely, zero or one. In the present embodiment, as illustrated in FIGS. 7 and 8, the grid region GR is indicated in black (1) in a case where the upwardly protruding object VP exists, and the grid region GR is indicated in white (0) in a case where the upwardly protruding portion VP does not exist. The configuration, however, is not limited to this.

The map storage database 36 is a map information storage unit that stores information regarding the position of the upwardly protruding object VP as map information MI of the operation region, and is connected to the first communication line 35A. The map storage database 36 includes at least one of a random access memory (RAM), a read only memory (ROM), a flash memory, and a hard disk drive. When the determination unit 33A determines that the GPS positional accuracy of the dump truck 2 detected by the GPS receiver 31 is above a predetermined accuracy, the map storage database 36 extracts, from the detection result of the laser sensor 24B, a detection result related to the upwardly protruding object VP of the operation region including the travel route RP, and stores the extracted detection result related to the upwardly protruding object VP as map information MI of the operation region. The map storage database 36 stores the detection result detected by the grid map creation unit 33C as map information MI each time the detection is performed by the grid map creation unit 33C. According to the present embodiment, the map information MI stored into the map storage database 36 is overwritten each time the detection is performed by the grid map creation unit 33C. The configuration, however, is not limited to this.

When the determination unit 33A determines that the GPS positional accuracy of the dump truck 2 detected by the GPS receiver 31 is the predetermined accuracy or below, the matching navigation position calculation unit 33B detects the position and azimuth of the dump truck 2 based on the detection result of the gyro sensor 26, the detection result of the speed sensor 27, the detection result of the laser sensor 24B, and the map information MI stored in the map storage database 36. The matching navigation position calculation unit 33B, as illustrated in FIG. 6, integrates the detection result of the gyro sensor 26, the detection result of the speed sensor 27, the detection result of the laser sensor 24B, and the map information MI stored in the map storage database 36 using a particle filter (PF) so as to detect the position and azimuth of the dump truck 2. According to the present embodiment, the matching navigation position calculation unit 33B detects the position and azimuth and outputs them to the travel controller 20. According to the present embodiment, the position and azimuth detected by the matching navigation position calculation unit 33B are input into the travel controller 20 with an interval of T3.

The position measurement controller 33 transmits the information regarding the position and azimuth of the dump truck 2 as the own vehicle, detected by the GPS receiver 31 or the matching navigation position calculation unit 33B, to the wireless communication device 18 of the management facility 7 via the wireless communication device 34.

Furthermore, the position measurement controller 33, as illustrated in FIG. 3, includes an observation point coordinate conversion unit 38 and an observation point availability judgment unit 39. The observation point coordinate conversion unit 38 converts a position as the detection result of the laser sensor 24B, displayed on a coordinate defined by the direction and distance from the laser sensor 24B, into the X-Y coordinates. The position of the detection result in which coordinates have been converted by the observation point coordinate conversion unit 38 is defined by the X-axis direction, the Y-axis direction, and additionally by the height direction (Z-axis direction) orthogonal to the X and Y directions. Information regarding the position of the work machine 4 other than the own vehicle is input from the route position storage unit 32A into the observation point availability judgment unit 39. The observation point availability judgment unit 39 removes various types of noise, a detection result for a predetermined height or less from an earth surface, and a detection result estimated to have detected the work machine 4 other than the own vehicle, from the detection result in which coordinates have been converted by the observation point coordinate conversion unit 38. The observation point availability judgment unit 39 combines the detection result of the laser sensor 24B, from which noise has been removed, with the detection result of the grid region GR. The observation point availability judgment unit 39 outputs the combined detection result to both the grid map creation unit 33C and the matching navigation position calculation unit 33B.

Figure 9:
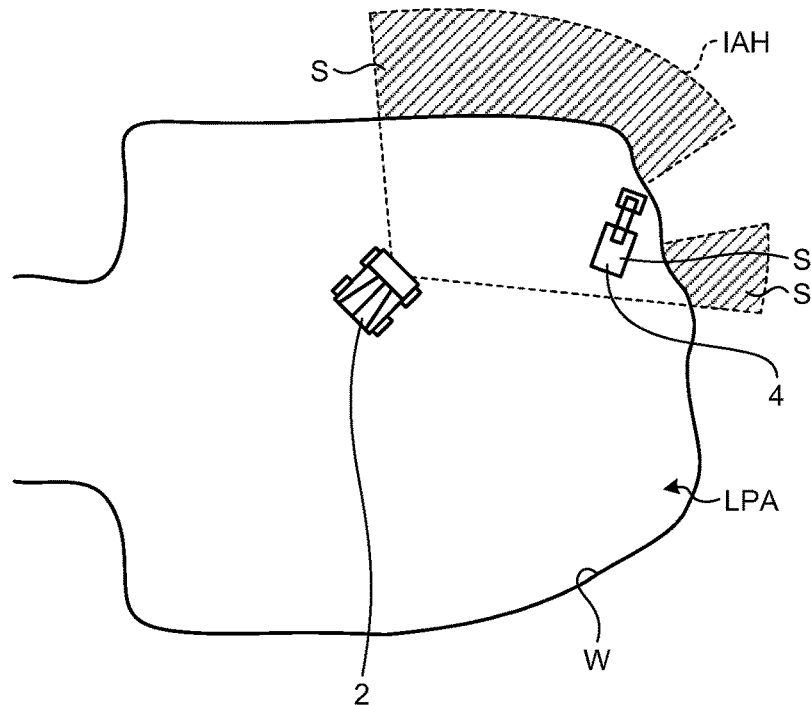
FIG. 9 is a diagram illustrating exemplary detection by a laser sensor.
Figure 10:
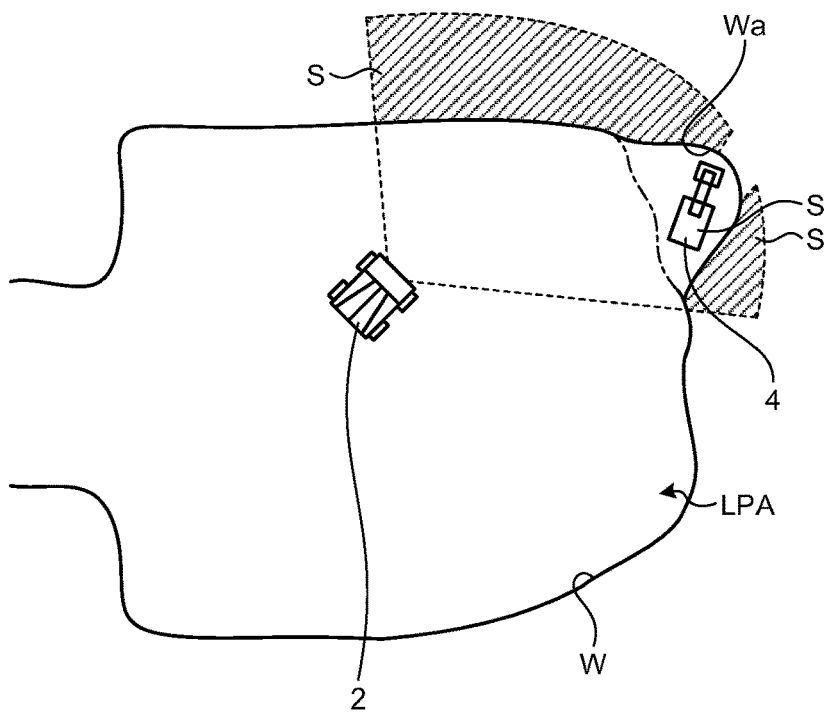
FIG. 10 is a diagram illustrating exemplary detection by a laser sensor.

FIGS. 9 and 10 are diagrams illustrating an exemplary case in which the dump truck 2 executes detection using the laser sensor 24B in the loading location LPA. FIG. 9 illustrates a state in which the dump truck 2 as the own vehicle enters the loading location LPA and other work machine (e.g., excavator, electric shovel, as a loading machine) 4 that is different from the dump truck 2 is mining soil from a wall portion W.

The soil mined by the work machine 4 is loaded onto the dump truck 2. Accordingly, the dump truck 2 moves to a position in the vicinity of the work machine 4 so as to load the soil. The management facility 7 sets a travel route from an entry of the loading location LPA to a soil loading position and transmits the travel route to the dump truck 2. The dump truck 2 travels along the received travel route.

At this time, the dump truck 2, as illustrated in FIG. 9, travels in the loading location LPA while emitting a laser beam onto the illumination range IAH. Among the wall portion W, the portion included in the illumination range IAH of the laser beam is detected as a portion S of the upwardly protruding object VP. Similarly, a portion of the work machine 4 that is included in the illumination range IAH of the laser beam is detected as a portion S of the upwardly protruding object VP. The dump truck 2 generates map information MI based on the detection result and stores it in the map storage database 36.

When mining by the work machine 4 progresses, as illustrated in FIG. 10, a portion of the wall portion W is scraped, and accordingly, the wall portion W is deformed into a recess. The work machine 4 moves so as to enter a recess Wa formed like this and continues mining. In a case where the dump truck 2 enters the loading location LPA with this state, a loading position of soil is set to a position that is closer to the recess Wa side rather than the position indicated in FIG. 9. From this state, it is assumed, for example, that the dump truck 2 calculates the position and azimuth by the matching navigation position calculation unit 33B. In this case, the dump truck 2, as illustrated in FIG. 10, travels in the loading location LPA while emitting the laser beam onto the illumination range IAH and detects the wall portion W and the work machine 4 as a portion S of the upwardly protruding object VP.

Figure 11:
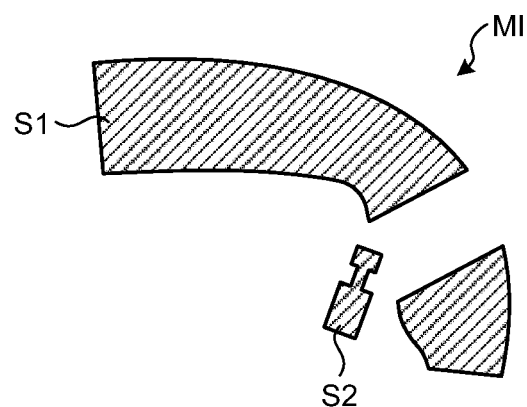
FIG. 11 is a diagram illustrating exemplary map information generated by a detection result.
Figure 12:
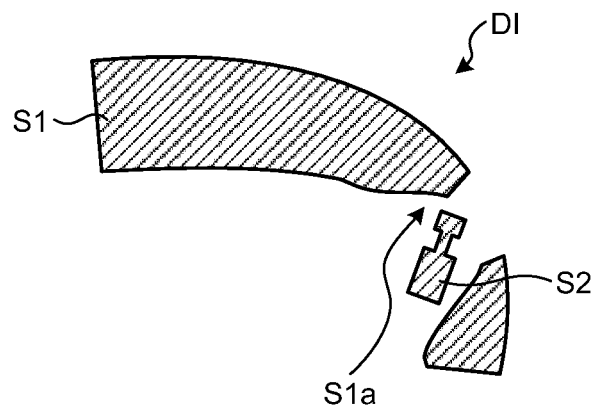
FIG. 12 is a diagram illustrating exemplary detected information generated by a detection result.

FIG. 11 is a diagram illustrating exemplary map information MI generated by the detection in a case illustrated in FIG. 9. FIG. 12 is a diagram illustrating exemplary information DI on an object to be detected, generated by the detection in a case illustrated in FIG. 10. As illustrated in FIGS. 11 and 12, each of the map information MI and the information DI on an object to be detected includes, respectively, information S1 on an object to be detected that corresponds to the portion S of the upwardly protruding object VP of the wall portion W and information S1 on an object to be detected that corresponds to the work machine 4. Meanwhile, the information DI on an object to be detected includes information S1a on an object to be detected that corresponds to the recess Wa of the wall portion W. The information S1a on an object to be detected is not included in the map information MI. There is deviation in the positions of the information S1 on an object to be detected between the map information MI and the information DI on an object to be detected. Therefore, in a case where the matching navigation position calculation unit 33B calculates the position of the dump truck 2 based on the map information MI and the information DI on an object to be detected, there is a portion in which the position information does not match with each other. Accordingly, this might decrease accuracy of the calculation result.

For this reason, in the present embodiment, in order to suppress the decrease in accuracy of the calculation result, the position measurement controller 33 is configured, at the time of map creation and position calculation, to set a mask region toward a terrain change portion in which a terrain changes by use of the work machine 4 along progress of operation, such as the above-described recess Wa and toward the work machine 4, and configured not to use the position information on the mask region of the information on an object to be detected, that is, configured to use the information from which the position information on the mask region has been excluded.

Figure 13:
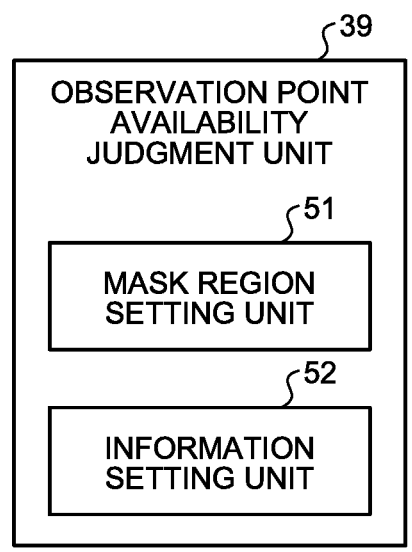
FIG. 13 is a block diagram illustrating an exemplary observation point availability judgment unit.

FIG. 13 is a block diagram illustrating an exemplary observation point availability judgment unit 39. As illustrated in FIG. 13, the observation point availability judgment unit 39 includes a mask region setting unit 51 and an information setting unit 52. The dump truck 2 can receive position-related information regarding the position of the terrain change portion or the position of the other work machine 4, via the wireless communication device 34. The mask region setting unit 51 sets a mask region including the terrain change portion or the other work machine 4 based on the position-related information received by the wireless communication device 34.

Figure 14:
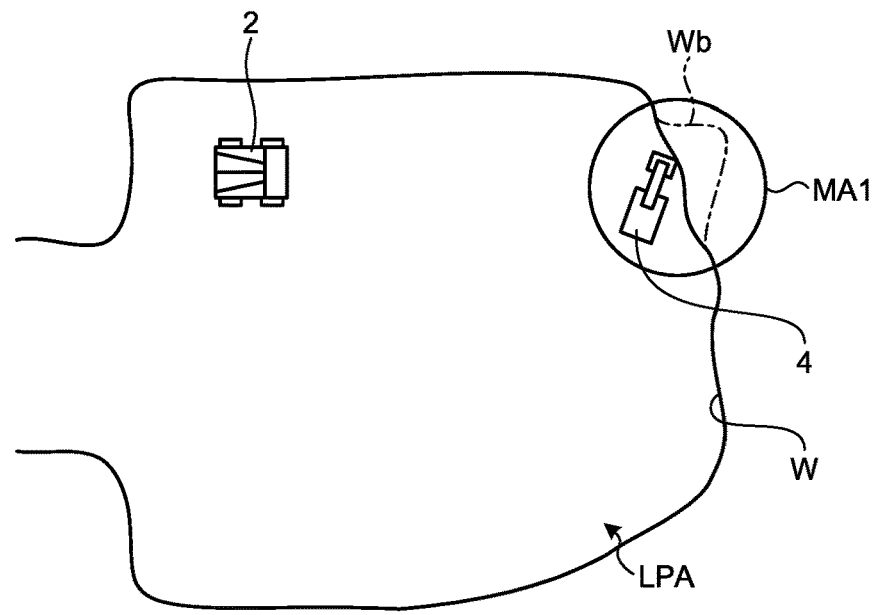
FIG. 14 is a diagram illustrating an exemplary mask region.

FIGS. 14 to 17 are diagrams illustrating exemplary terrain change portions and mask regions. FIG. 14 illustrates an example in the loading location LPA. In the loading location LPA, as illustrated in FIG. 14, a portion of the wall portion W is mined by the work machine 4 including an excavator and an electric shovel. In this case, a portion Wb mined by the work machine 4, from among the wall portion W, is a terrain change portion. Accordingly, the mask region setting unit 51 can set a mask region MA1 toward a region including the work machine 4 and a portion (terrain change portion) Wb mined by the work machine 4. The mask region MA1 is set, for example, as a circular region having a predetermined radius. Note that the shape of the mask region MA1 is not limited to a circle but an ellipse or polygon may be used as setting of the mask region MA1.

Figure 15:
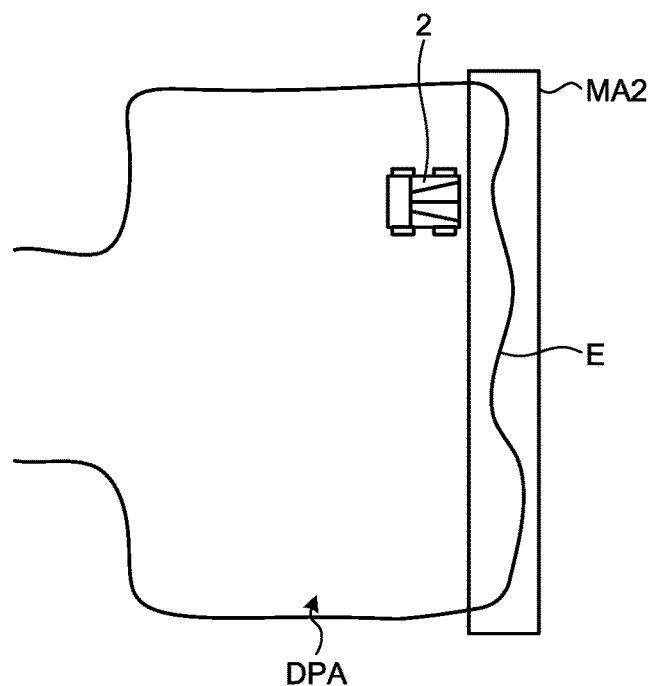
FIG. 15 is a diagram illustrating an exemplary mask region.

FIG. 15 illustrates an example in an edge dump area in the dumping location DPA. As illustrated in FIG. 15, in the edge dump area of the dumping location DPA, a load such as soil is dumped from the dump truck 2 to a cliff portion (edge portion) E. When dumping by the dump truck 2 is repeated, a terrain of the cliff portion E is changed, in some cases, by the dumped soil, or the like. In this case, the cliff portion E to which the load is dumped is a terrain change portion. Accordingly, the mask region setting unit 51 can set a mask region MA2 toward a region including the cliff portion E that is a terrain change portion of the edge dump area as illustrated in FIG. 15. In this case, the mask region MA2 is formed in a band shape along the cliff portion E. As the mask region MA2, one region is set in a rectangular shape. The configuration, however, is not limited to this. A plurality of regions may be set and the shape may be different from the rectangular shape.

Figure 16:
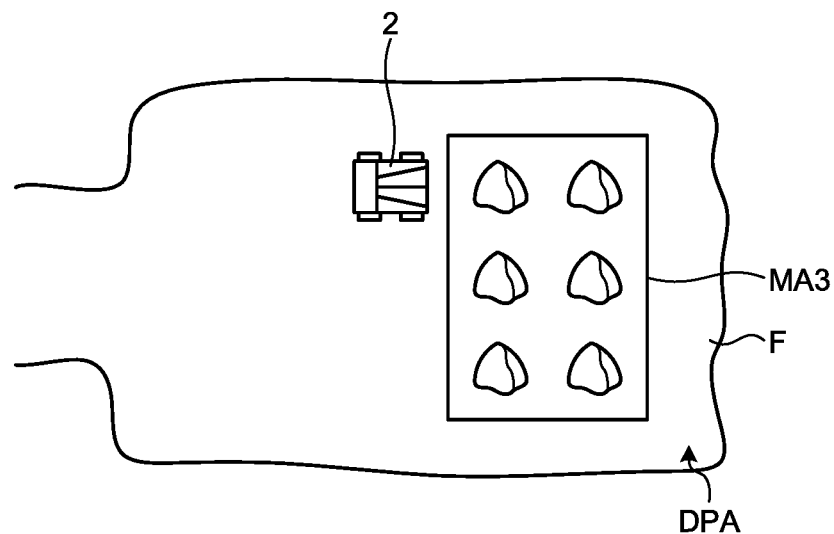
FIG. 16 is a diagram illustrating an exemplary mask region.

FIG. 16 illustrates an example in a paddock dump area in the dumping location DPA. As illustrated in FIG. 16, in the paddock dump area of the dumping location DPA, different dumping positions are transmitted sequentially from the management facility 7, and accordingly, loads such as soil are dumped from the dump truck 2 to a road surface F. The dumped load is piled up on the road surface F. When dumping by the dump truck 2 is repeated, dumped soil, or the like, is disposed in a plurality of positions on the road surface F, and accordingly, the terrain of the road surface F changes. In this case, the road surface F to which the load is disposed is a terrain change portion. Accordingly, the mask region setting unit 51 can set, as illustrated in FIG. 16, a mask region MA3 collectively for regions in which soil, or the like, can be disposed, on the road surface F of the paddock dump area. In this case, as the mask region MA3, one region is set in a rectangular shape. The configuration, however, is not limited to this. A plurality of regions may be set and the shape may be different from the rectangular shape.

Figure 17:
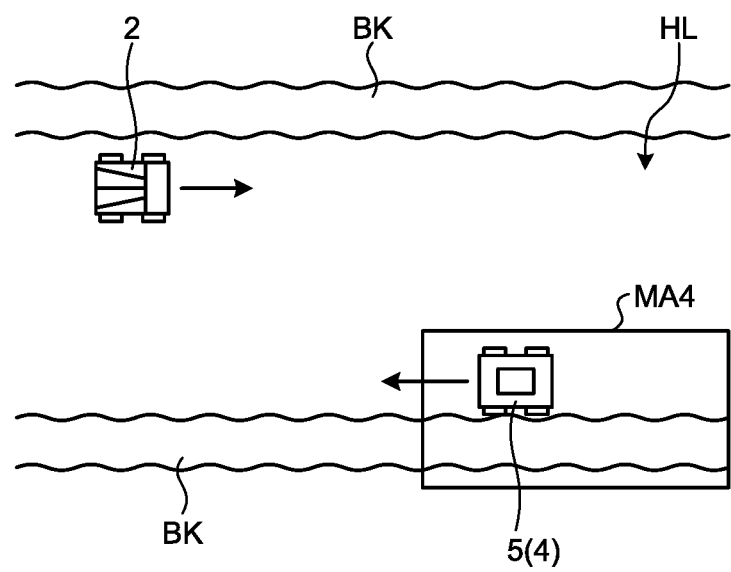
FIG. 17 is a diagram illustrating an exemplary mask region.

FIG. 17 illustrates an example on the transportation path HL. As illustrated in FIG. 17, the dump truck 2 travels on the transportation path HL. On the transportation path HL, a mending vehicle 5 travels. The mending vehicle 5 is a vehicle that mends the bank BK, or the like, of the transportation path HL. When the bank BK is mended by the mending vehicle 5, the terrain of the bank BK changes. In this case, the bank BK is a terrain change portion. Accordingly, the mask region setting unit 51 can set a mask region MA4, as illustrated in FIG. 17, in a region along travel tracks of the mending vehicle 5. In this case, the mask region MA4 may include the bank BK.

The mask region setting unit 51 sets the above-described mask regions MA1 to MA4 based on the position-related information from the management facility 7. In the above-described example of the loading location LPA, the position-related information includes information regarding the position of the work machine 4 such as an excavator and an electrical shovel and information regarding the position mined by the work machine 4. In the above-described example of the edge dump area, the position-related information includes information regarding a position to which the dump truck 2 is scheduled to dump a load. In the above-described example of the paddock dump area, the position-related information includes information regarding a position to which the dump truck 2 is scheduled to dump.

In the above-described example of the transportation path HL, the position-related information includes information regarding a travel position of the mending vehicle 5. When the travel position of the mending vehicle 5 changes, it is possible to configure such that the mask region setting unit 51 estimates the travel position of the mending vehicle 5 and sets the mask region MA4 based on an estimated result.

The information setting unit 52 discriminates whether information on an object to be detected exists within the mask region MA. The information setting unit 52, in a case where it has discriminated existence of information on an object to be detected within the mask region MA, sets the information on an object to be detected existing in the mask region MA as moving object information. Hereinafter, functions of the information setting unit 52 will be described with specific examples.

Figure 18:
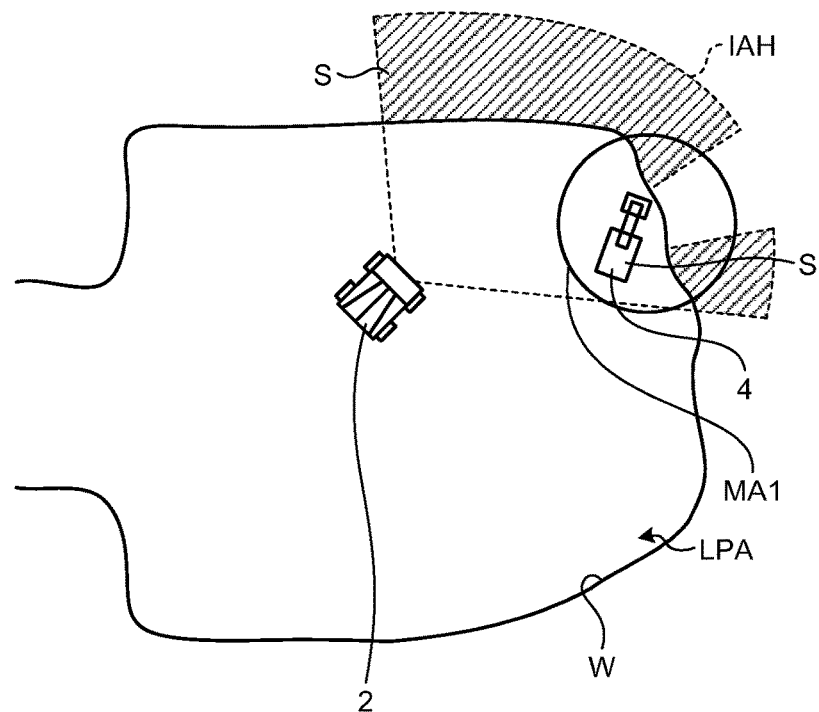
FIG. 18 is a diagram illustrating exemplary detection by a laser sensor.
Figure 19:
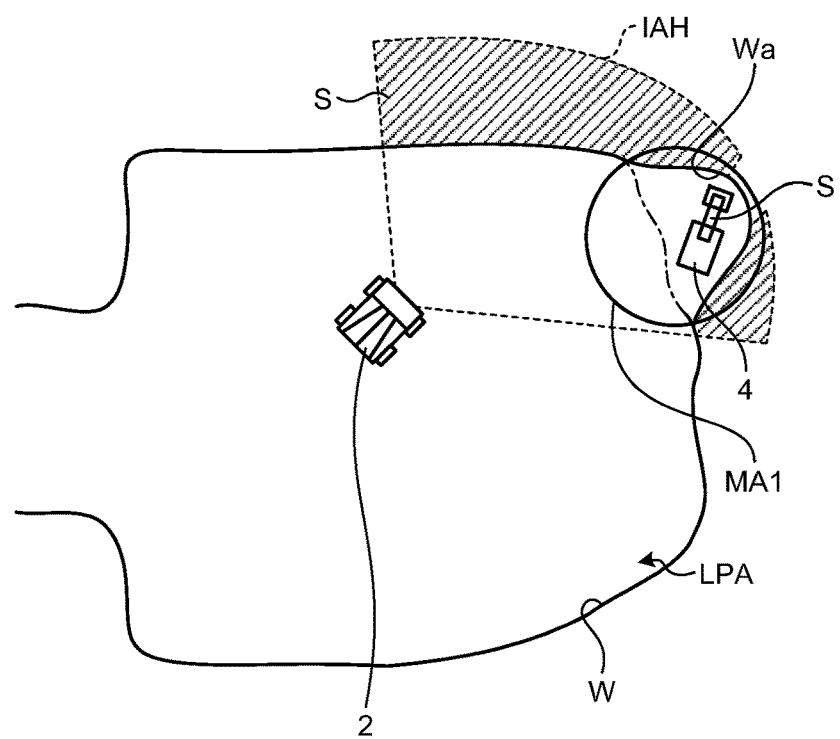
FIG. 19 is a diagram illustrating exemplary detection by a laser sensor.

FIGS. 18 and 19 are diagrams illustrating an exemplary detection performed by the laser sensor 24B in a state where the mask region MA1 has been set in the loading location LPA. As illustrated in FIG. 18, the dump truck 2 as the own vehicle emits a laser beam onto the illumination range IAH while traveling in the loading location LPA. The dump truck 2 detects the wall portion W and the work machine 4 as a portion S of the upwardly protruding object VP and generates map information MI based on the detection result.

When mining using the work machine 4 progresses in this state, as illustrated in FIG. 19, a portion of the wall portion W is scraped, and accordingly, the wall portion W is deformed into a recess. Note that the recess Wa and the work machine 4 are kept within the mask region MA1. In this state, it is assumed that the dump truck 2 enters the loading location LPA and calculates the position and azimuth by the matching navigation position calculation unit 33B. In this case, the dump truck 2, as illustrated in FIG. 19, travels in the loading location LPA while emitting the laser beam onto the illumination range IAH and detects the wall portion W and the work machine 4 as a portion S of the upwardly protruding object VP.

Figure 20:
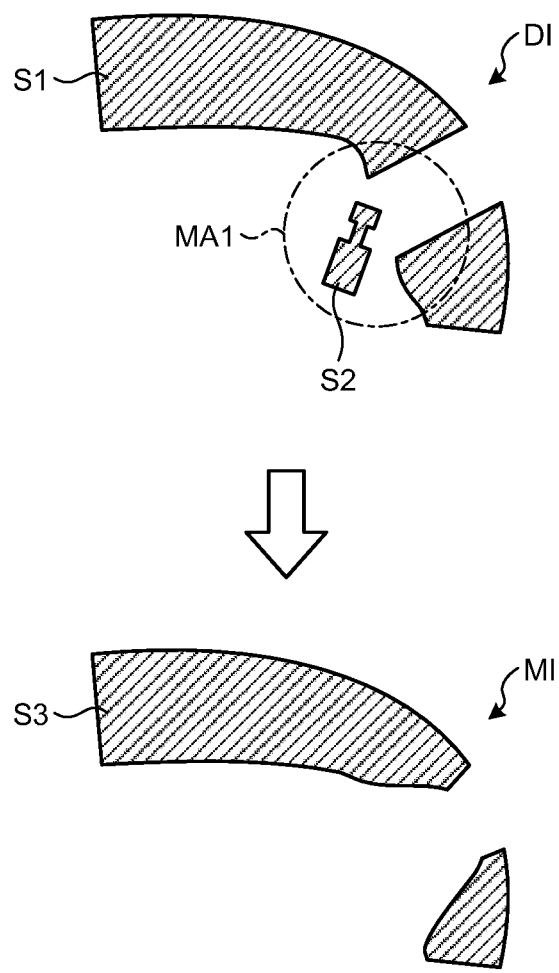
FIG. 20 is a diagram illustrating exemplary detected information and map information.

FIG. 20 is a diagram illustrating exemplary information DI on an object to be detected and map information MI, obtained in a case illustrated in FIG. 18. The information DI on an object to be detected includes information S1 on an object to be detected that corresponds to the work machine 4. With this state, the information setting unit 52 discriminates whether the position information of the upwardly protruding object VP detected by the laser sensor 24B exists within the mask region MA1, with inside/outside determination processing, or the like. The information setting unit 52 discriminates, for example, that a portion of the information S1 on an object to be detected and the information S1 on an object to be detected exist within the mask region MA1. In a case where it is discriminated that the position information of the upwardly protruding object VP exists within the mask region MA1, the information setting unit 52 deletes the position information of the upwardly protruding object VP within the mask region MA1. This procedure deletes the information S1 on an object to be detected. Thereafter, the grid map creation unit 33C creates map information MI based on information DI on an object to be detected from which the position information has been deleted. As illustrated in FIG. 20, information S3 on an object to be detected is formed in the map information MI. The information S3 on an object to be detected corresponds to a portion from which a shape along the mask region MA1 has been deleted.

Figure 21:
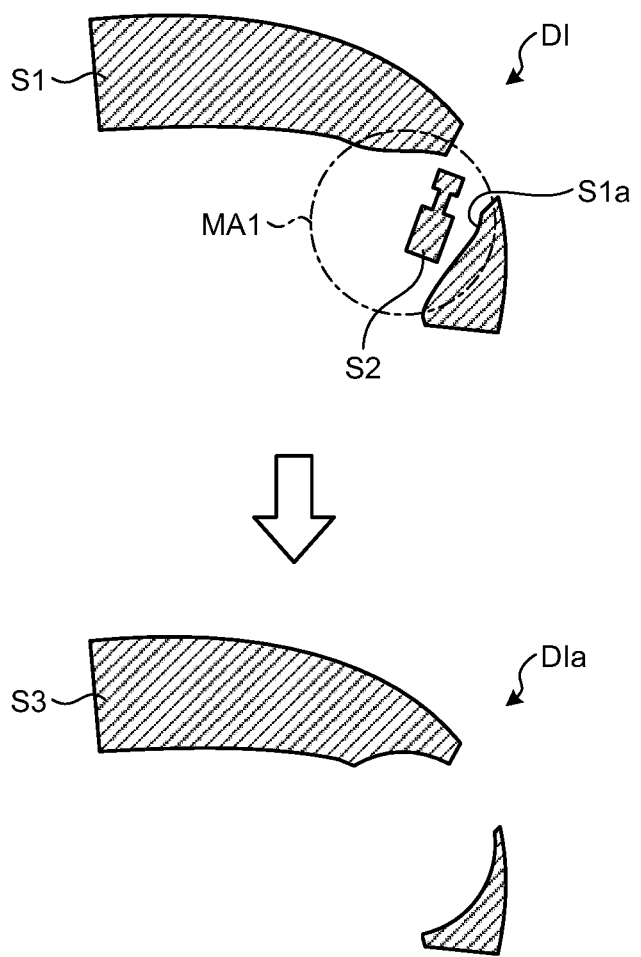
FIG. 21 is a diagram illustrating exemplary detected information.

Meanwhile, FIG. 21 is a diagram illustrating exemplary information DI on an object to be detected, obtained in a case illustrated in FIG. 19. The information DI on an object to be detected includes information S1a on an object to be detected that corresponds to the recess Wa, and information S1 on an object to be detected that corresponds to the work machine 4. With this state, the information setting unit 52 discriminates whether the position information of the upwardly protruding object VP exists within the mask region MA1, with inside/outside determination processing, or the like. For example, the information setting unit 52 discriminates that the information S1a on an object to be detected and the information S1 on an object to be detected exist within the mask region MA1. In a case where it is discriminated that the position information of the upwardly protruding object VP exists within the mask region MA1, the information setting unit 52 deletes the position information of the upwardly protruding object VP within the mask region MA1. This procedure deletes the information S1 on an object to be detected and the information S1 on an object to be detected. As illustrated in FIG. 21, the deleted portion S3 having a shape along the mask region MA1 is formed in information DIa on an object to be detected. Position information of the information DIa on an object to be detected corresponds to the position information of the map information MI illustrated in FIG. 20. Accordingly, in a case where the matching navigation position calculation unit 33B calculates the position of the dump truck 2 based on the map information MI and on the information DIa on an object to be detected, illustrated in FIG. 20, a non-matching portion between the position information would be deleted. With this configuration, it is possible to suppress a decrease in accuracy of the calculation result.

The position measurement controller 33 is a computer that includes at least input/output for communication, a central processing unit (CPU) that executes a control program, a read only memory (ROM) that stores the control program, a random access memory (RAM) used as a CPU operation region, and a nonvolatile memory on which information is registered by the CPU. Functions of the determination unit 33A, the matching navigation calculation unit 33B, the grid map creation unit 33C, the observation point coordinate conversion unit 38, and the observation point availability judgment unit 39 are implemented when the CPU reads a control program stored in the ROM and executes it in the operation region in the RAM. The nonvolatile memory includes at least one of a flash memory and a hard disk drive. It is possible to configure such that a plurality of processing circuits works in cooperation to implement functions of the determination unit 33A, the matching navigation calculation unit 33B, the grid map creation unit 33C, the observation point coordinate conversion unit 38, and the observation point availability judgment unit 39.

The safety controller 40 obtains a relative position of the dump truck 2 with respect to an obstacle based on detection signals of the radar 24A and the laser sensor 24B. The safety controller 40, using the relative position with respect to the obstacle, generates a command for controlling at least one of the accelerator, a braking device 23B, and the operation device 2S, and outputs the command to the travel controller 20. The travel controller 20 controls the dump truck 2 based on the command obtained from the safety controller 40 and avoids collision of the dump truck 2 with an obstacle.

The travel controller 20 outputs to the travel controller 20 a command for controlling the braking device 23B to stop the vehicle main body 21 in a case where the determination unit 33A has determined that the GPS position solution is a float solution, a single-point positioning solution, or where a non-positioning state of the GPS position has continued for a predetermined time and the matching navigation position calculation unit 33B has obtained a detection result of the laser sensor 24B in which an ultimate estimation value using the map information MI stored in the map storage database 36 is lower than a predetermined value.

<Work Machine Control Method>

Figure 22:
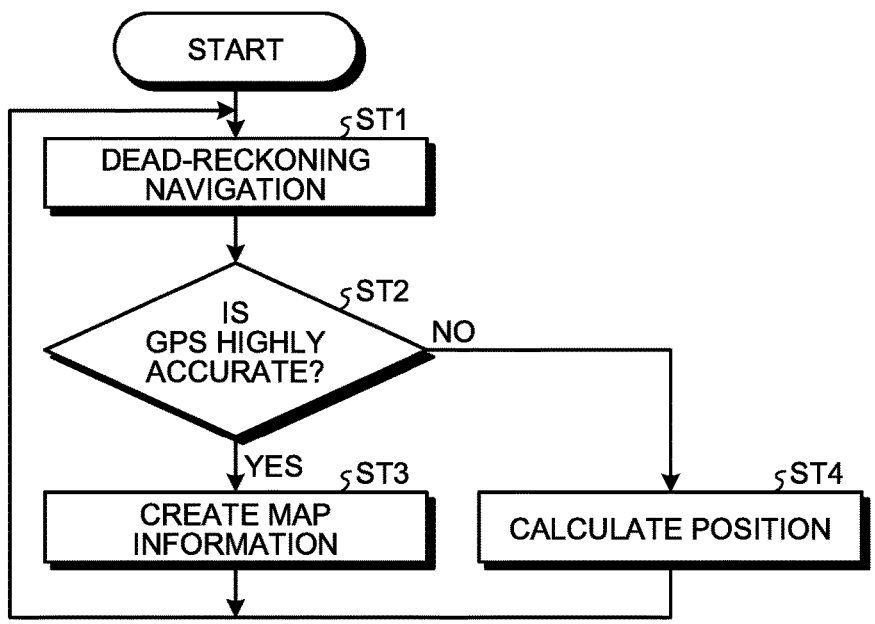
FIG. 22 is an exemplary flowchart of the work machine control system according to the first embodiment.
Figure 23:
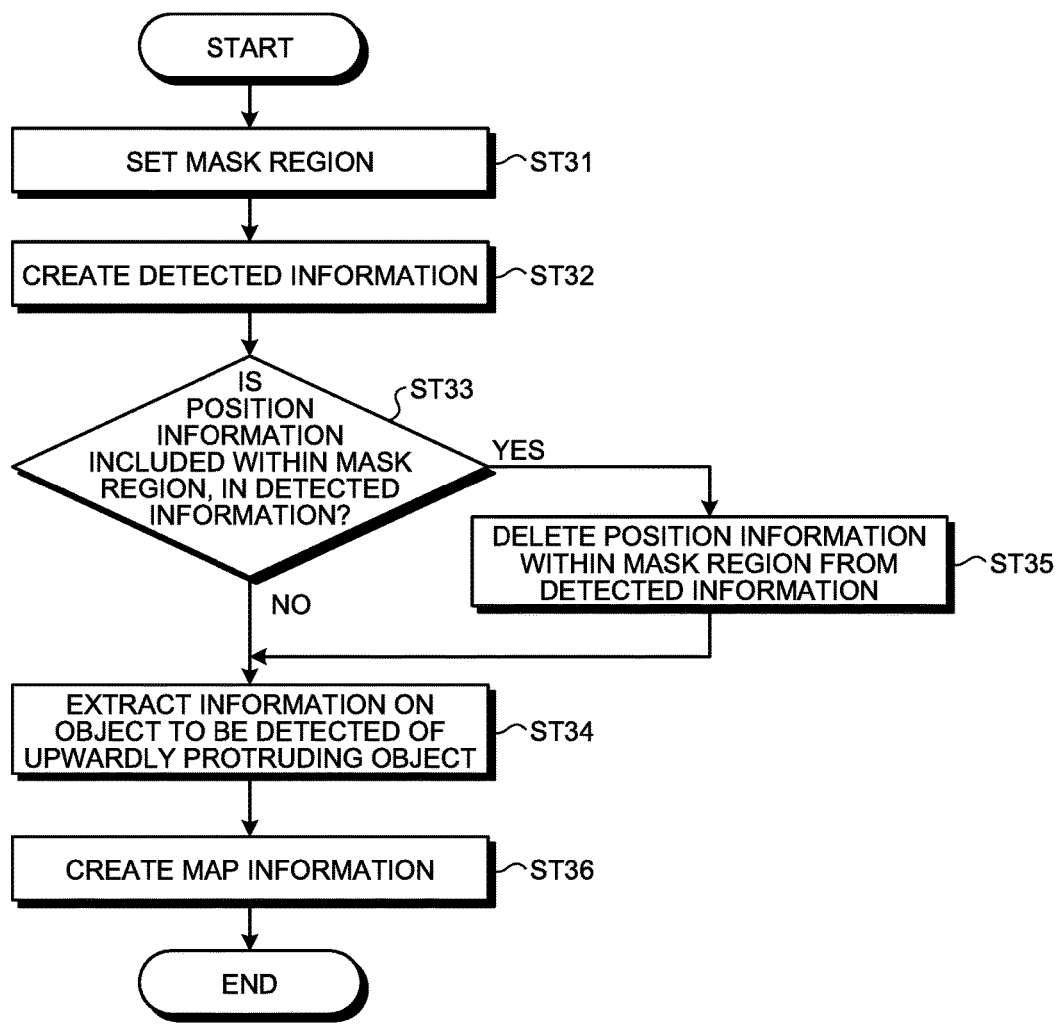
FIG. 23 is an exemplary flowchart of step ST3 in FIG. 22.

Next, a control method of the work machine according to the present embodiment, namely, exemplary operation of the work machine control system 30 will be described. FIG. 22 is an exemplary flowchart of the work machine control system according to the present embodiment. FIG. 23 is an exemplary flowchart of step ST3 in FIG. 22.

The work machine control method is a control method of a work machine of the dump truck 2 that travels along the travel route RP in the operation region. According to the work machine control method, the processing device 12 transmits a command signal to the travel route creation device 32 and the position measurement controller 33, of the dump truck 2, via the wireless communication device 18. The command signal includes information regarding travel conditions of the dump truck 2 and information regarding the position of the work machine 4 other than the own vehicle. The information regarding the travel conditions includes travel route information generated in the processing device 12 and information regarding the travel speed of the dump truck 2. Among command signals transmitted from the processing device 12 via the communication system 9, the travel route creation device 32 stores the travel route information and information regarding the position of the work machine 4 other than the own vehicle into the route position storage unit 32A. When the travel route creation device 32 has received the command signal from the processing device 12, including travel route information, the position measurement controller 33 transmits information regarding the position and azimuth of the dump truck 2 as the own vehicle, to the processing device 12, via the wireless communication device 34. Based on the command signal from the processing device 12, the travel controller 20 controls the accelerator, the braking device 23B, and the operation device 2S, of the dump truck 2, to control travel of the dump truck 2.

Based on the GPS position of the dump truck 2 detected by the GPS receiver 31, the travel controller 20 of the work machine control system 30 executes step ST1 to cause the dump truck 2 to travel along the travel route RP by dead-reckoning navigation. According to the present embodiment, the travel controller 20 causes the dump truck 2 to travel on at least one of the loading location LPA, the dumping location DPA, the transportation path HL, and the intersection IS in accordance with the travel route information generated by the processing device 12 of the management device 10 and with the travel conditions including a travel speed (target travel speed) set by the processing device 12. Dead-reckoning navigation is navigation to estimate a current position of a target (dump truck 2) based on the azimuth (change amount of azimuth) and a moving distance from a known position. The azimuth (change amount of azimuth) of the dump truck 2 is detected using the gyro sensor 26 arranged on the dump truck 2. The moving distance of the dump truck 2 is detected using the speed sensor 27 arranged on the dump truck 2. A detection signal of the gyro sensor 26 and a detection signal of the speed sensor 27 are output to the travel controller 20 of the dump truck 2.

The travel controller 20 can obtain the azimuth (change amount of azimuth) of the dump truck 2 from a known origin based on the detection signal from the gyro sensor 26 The travel controller 20 can obtain the moving distance of the dump truck 2 from a known origin based on a detection signal from the speed sensor 27. Based on the detection signal from the gyro sensor 26 and the detection signal from the speed sensor 27, the travel controller 20 generates the amount of control regarding travel of the dump truck 2 such that the dump truck 2 travels along the generated travel route RP. The amount of control includes an accelerator signal, a braking signal, and a steering signal. The travel controller 20 controls travel (operation) of the dump truck 2 based on the steering signal, the accelerator signal, and the braking signal.

Next, an example in which the dump truck 2 travels while an estimated position obtained by using dead-reckoning navigation is being corrected using RTK-GNSS or the matching navigation position calculation unit 33B will be described. When the travel distance of the dump truck 2 becomes long, detection errors accumulated in one or both of the gyro sensor 26 and the speed sensor 27 might cause an error between an estimated position and an actual position. As a result, the dump truck 2 might travel being dislocated from the travel route RP generated by the processing device 12. According to the present embodiment, the travel controller 20 causes the dump truck 2 to travel while correcting the position (estimated position) of the dump truck 2 derived (estimated) by dead-reckoning navigation, using the GPS position detected by the GPS receiver 31 or the position detected by the matching navigation position calculation unit 33B. Based on the detection signal from the gyro sensor 26, the detection signal from the speed sensor 27, and the GPS position from the GPS receiver 31 or the position detected by the matching navigation position calculation unit 33B, the travel controller 20 calculates the amount of control regarding travel of the dump truck 2, including the amount of correction to correct the position of the dump truck 2, such that the dump truck 2 travels along the travel route RP. The travel controller 20 controls travel (operation) of the dump truck 2 based on the calculated amount of correction or calculated amount of control such that the dump truck 2 travels along the travel route RP.

Next, the determination unit 33A of the position measurement controller 33 executes step ST2 that determines whether the GPS positional accuracy of the dump truck 2, detected by the GPS receiver 31, is above a predetermined accuracy. That is, in step ST2, the determination unit 33A of the position measurement controller 33 determines whether the GPS positional accuracy of the dump truck 2 detected by the GPS receiver 31 is high. Specifically, the determination unit 33A of the position measurement controller 33 determines whether the GPS position solution detected by the GPS receiver 31 is a fixed solution.

When the determination unit 33A of the position measurement controller 33 determines that the GPS position solution detected by the GPS receiver 31 is a fixed solution, that is, the GPS positional accuracy of the dump truck 2 detected by the GPS receiver 31 is determined to be high (step ST2: Yes), the grid map creation unit 33C creates map information MI (step ST3). Specifically, when the position measurement controller 33 determines that the GPS positional accuracy detected by the GPS receiver 31 is high, the position measurement controller 33 executes step ST3 that causes the dump truck 2 to autonomously travel along the travel route RP stored in the route position storage unit 32A based on the GPS position of the dump truck 2 detected by the GPS receiver 31, and that extracts detection result regarding the upwardly protruding object VP from the detection result of the laser sensor 24B and stores the extracted detection result regarding the upwardly protruding object VP in the map storage database 36 as map information MI of the operation region.

Specifically, the mask region setting unit 51 sets a mask region MA for each of the loading location LPA, the dumping location DPA, the transportation path HL, and the intersection IS based on the position-related information transmitted from the management facility 7 (step ST31).

Next, the observation point coordinate conversion unit 38 converts a position as the detection result of the laser sensor 24B displayed on a coordinate defined by the direction and distance from the laser sensor 24B into a coordinate position displayed on the X-Y coordinates so as to generate information DI on an object to be detected (step ST32).

Next, the information setting unit 52 judges, in the information DI on an object to be detected, whether the information on an object to be detected of the upwardly protruding object VP is included within the mask region MA (step ST33). In a case where it is discriminated that the information on an object to be detected of the upwardly protruding object VP does not exist within the mask region MA (step ST33: No), extraction operation is executed to extract information on an object to be detected of the upwardly protruding object VP, from the information DI on an object to be detected (step ST34).

When it is discriminated that the information on an object to be detected of the upwardly protruding object VP exists within the mask region MA (step ST33: Yes), the position measurement controller 33 deletes the position information of the upwardly protruding object VP within the mask region MA from the information DI on an object to be detected (step ST35), and thereafter executes extraction operation (step ST34).

In a case where extraction operation is executed, the observation point availability judgment unit 39 initially removes various types of noise from the detection result for which coordinate conversion has been performed by the observation point coordinate conversion unit 38. Specifically, the observation point availability judgment unit 39 removes, as noise, from the detection result for which coordinate conversion has been performed by the observation point coordinate conversion unit 38, a detection result with low reflection intensity, a detection result in which the laser beam seems to have been transmitted through a transparent object, a detection result in which the laser beam seems to have detected dust, a detection result in which the laser beam is reflected from the ground, and a detection result in which the laser beam seems to have detected a lump of soil on the ground.

Note that, in step ST31, the observation point availability judgment unit 39 initially removes various types of noise from the detection result for which coordinate conversion has been performed by the observation point coordinate conversion unit 38. Specifically, the observation point availability judgment unit 39 removes, as noise, from the detection result for which coordinate conversion has been performed by the observation point coordinate conversion unit 38, a detection result with low reflection intensity, a detection result in which the laser beam seems to have been transmitted through a transparent object, a detection result in which the laser beam seems to have detected dust, a detection result in which the laser beam is reflected from the ground, and a detection result in which the laser beam seems to have detected a lump of soil on the ground.

The observation point availability judgment unit 39 removes a detection result in which the distance from the dump truck 2 is the maximum distance or more, and the detection result in which the distance is the minimum distance or less, from the detection result in which coordinate conversion has been performed by the observation point coordinate conversion unit 38. According to the present embodiment, a predetermined maximum distance is a distance required to remove noise due to sunlight, and a predetermined minimum distance is a distance for removing thick dust noise occurring at close range from the laser sensor 24B.

The observation point availability judgment unit 39 removes a detection result for a predetermined height or less from the earth surface, from the detection result for which coordinate conversion has been performed by the observation point coordinate conversion unit 38. According to the present embodiment, the observation point availability judgment unit 39 removes the detection result for the predetermined height or less. The configuration, however, is not limited to this. In this manner, the observation point availability judgment unit 39 removes various types of noise, or the like, from the detection result.

The observation point availability judgment unit 39 combines the detection result in which various types of noise, or the like, have been removed, with the detection result formed with the grid regions GR the positions of which are displayed on the X-Y coordinates. The observation point availability judgment unit 39 outputs the combined detection result to both the grid map creation unit 33C and the matching navigation position calculation unit 33B.

Thereafter, the grid map creation unit 33C of the position measurement controller 33 stores the position of the upwardly protruding object VP as the detection result combined by the observation point availability judgment unit 39, into the map storage database 36 as map information MI of the travel route RP (step ST36). Map information is created with this procedure.

Figure 24:
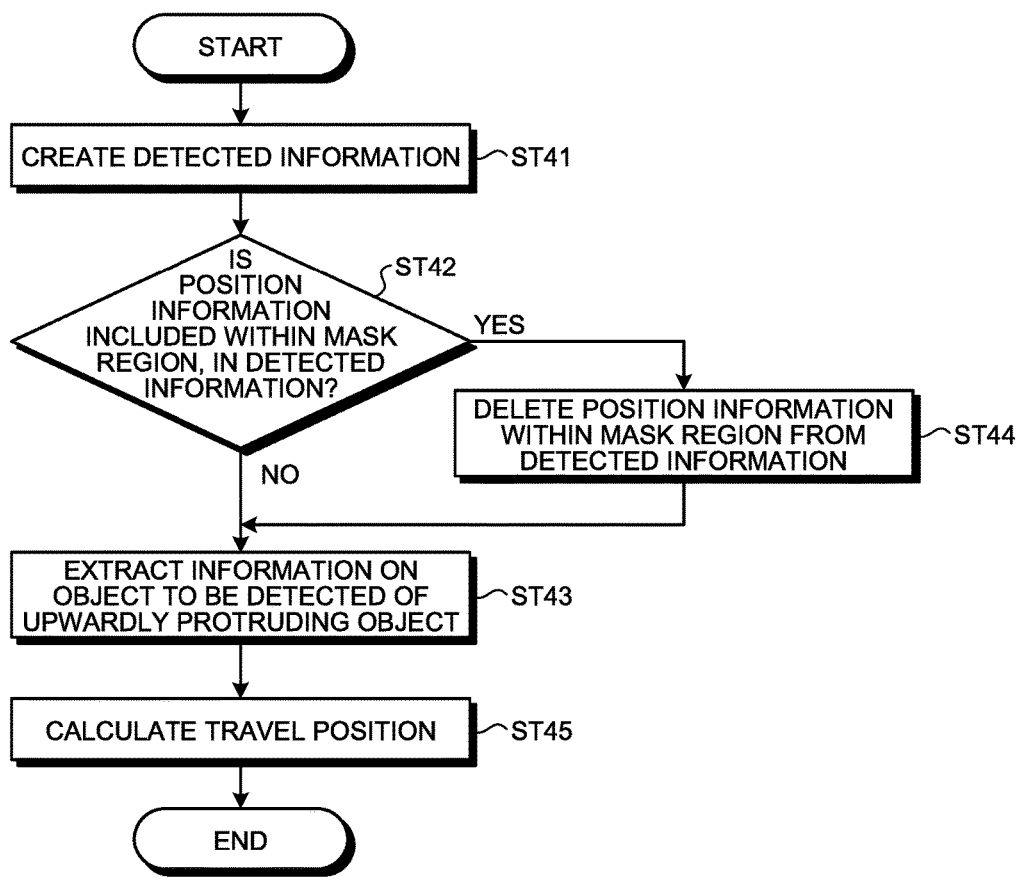
FIG. 24 is an exemplary flowchart of step ST4 in FIG. 22.

As illustrated in FIG. 24, the determination unit 33A of the position measurement controller 33 determines that the GPS position solution detected by the GPS receiver 31 is not a fixed solution, that is, determines that the GPS positional accuracy of the dump truck 2 detected by the GPS receiver 31 is a predetermined accuracy or below (step ST2: No). Accordingly, the matching navigation position calculation unit 33B detects the position and azimuth of the dump truck 2 based on the detection result of the laser sensor 24B and on the map information MI stored in the map storage database 36 so as to travel the dump truck 2 along the travel route RP (step ST4). That is, when the position measurement controller 33 determines that the GPS positional accuracy detected by the GPS receiver 31 is the predetermined accuracy or below, the position measurement controller 33 matches the detection result of the laser sensor 24B against the map information MI stored in the map storage database 36, thereby calculating the position and azimuth of the dump truck 2.

Specifically, similarly to the case of map creation, the observation point coordinate conversion unit 38 generates information DI on an object to be detected that converts the position of the detection result of the laser sensor 24B displayed on a coordinate defined by the direction and distance from the laser sensor 24B into the position on the X-Y coordinates (step ST41). Next, the information setting unit 52 judges, in the information DI on an object to be detected, whether the position information is included within the mask region MA (step ST42). In a case where it is judged that the position information is not included within the mask region MA (step ST42: No), extraction operation is executed to extract position information on the upwardly protruding object VP from the information DI on an object to be detected (step ST43). When it is judged that the position information is included within the mask region MA (step ST42: Yes), the position measurement controller 33 deletes the position information within the mask region MA from the information DI on an object to be detected (step ST44), and thereafter executes extraction operation (step ST43). Since processing in steps ST41 to ST44 is equal to the processing in the above-described steps ST32 to ST35, detailed description will be omitted.

Thereafter, the matching navigation position calculation unit 33B calculates the position and azimuth of the dump truck 2 (step ST45). In step ST45, the matching navigation position calculation unit 33B thins out, through an isolation filter, the detection result in which noise has been removed by the observation point availability judgment unit 39. Specifically, from among the detection result in which noise has been removed by the observation point availability judgment unit 39, the matching navigation position calculation unit 33B keeps the detection result having a predetermined distance or more from each other, and removes the other detection results.

The matching navigation position calculation unit 33B integrates the detection result of the gyro sensor 26, the detection result of the speed sensor 27, the detection result of the laser sensor 24B, and the map information MI stored in the map storage database 36 using a particle filter (PF) so as to detect the position and azimuth of the dump truck 2. Specifically, the matching navigation position calculation unit 33B calculates a plurality of positions and azimuths within a range in which the dump truck 2 is estimated to exist at a certain point based on the azimuth as a detection result of the gyro sensor 26 and on the travel speed as a detection result of the speed sensor 27.

The matching navigation position calculation unit 33B, based on the map information MI stored in the map storage database 36, estimates a detection result expected to be detected by the laser sensor 24B in a case where the dump truck 2 is located at a position and azimuth at which the dump truck 2 is expected to exist. The matching navigation position calculation unit 33B matches the detection result expected to be detected by the laser sensor 24B against the detection result actually detected by the laser sensor 24B. Accordingly, the matching navigation position calculation unit 33B calculates likelihood of the detection result expected to be detected, at each of positions and azimuths, by the laser sensor 24B with respect to the detection result actually detected by the laser sensor 24B. The matching navigation position calculation unit 33B normalizes the likelihood of each of the positions and azimuths.

The matching navigation position calculation unit 33B calculates an ultimate estimation value from the likelihood of the detection result to be expected to be detected in each of the positions and azimuths by the laser sensor 24B and each of the positions, and then, calculates a position and azimuth in which the detection result expected to be detected by the laser sensor 24B is the closest to the detection result actually detected by the laser sensor 24B. The matching navigation position calculation unit 33B detects the closest position and azimuth as the position and azimuth of the dump truck 2. The matching navigation position calculation unit 33B, when it has calculated the closest position and azimuth, also calculates estimated accuracy and reliability of the closest position and azimuth.

As described above, according to the present embodiment, when extraction operation, generation operation, and identification operation are executed, it is configured not to use information on an object to be detected of the mask region MA that is set as a portion of a mine, among the information DI on an object to be detected. Accordingly, it is possible to suppress decrease in accuracy of the calculation result when the position of the dump truck 2 is calculated. With this configuration, it is possible to suppress a decrease in productivity in a mine.

In the control system of the dump truck that performs unmanned travel along the travel route that has been set in a mine, described in the present embodiment, the travel route has been set at a same position within the transportation path, and thus, travel is achieved within a predetermined accuracy along the travel route. With this configuration, since detection of the upwardly protruding portion such as a shape of the bank, performed during the travel, is performed from a substantially same position, it is possible to suppress variation in detection results. Accordingly, it is possible improve accuracy in creating terrain information and performing position identification.

The technical scope of the present invention is not limited to the above-described embodiment but can be modified as appropriate without departing from the spirit and scope of the present invention. For example, the above-described embodiment describes an example in which all of position information within a mask region MA is removed. The configuration, however, is not limited to this.

Figure 25:
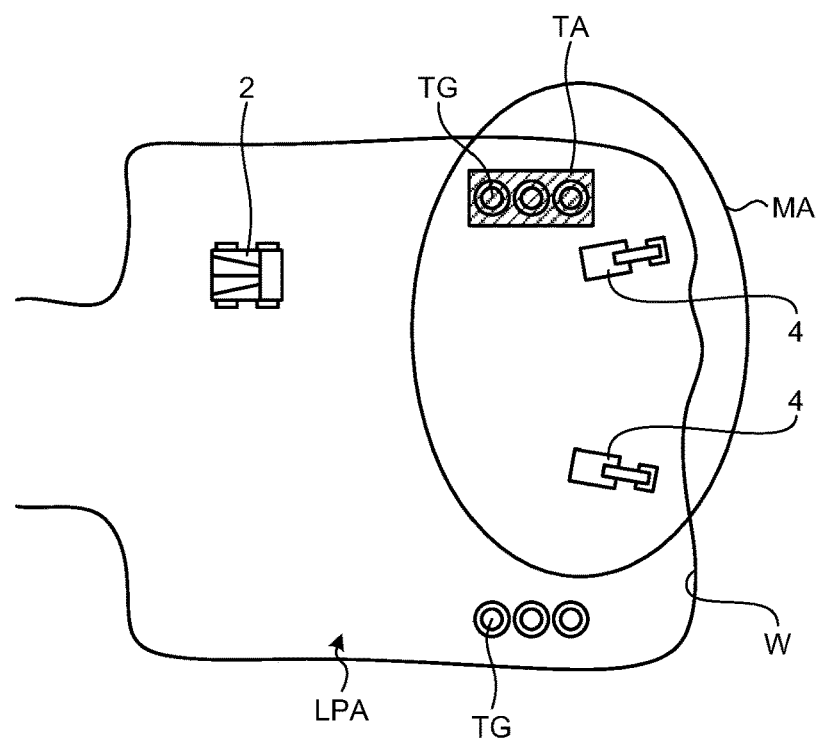
FIG. 25 is a diagram illustrating exemplary detection by a laser sensor.

FIG. 25 is a diagram illustrating modification in which the dump truck 2 executes detection using the laser sensor 24B in the loading location LPA. As illustrated in FIG. 25, a target TG is arranged in the loading location LPA. In a case where the mask region MA is set in a wide range, the information on an object to be detected that is to be removed would increase. This might decrease the amount of information on an object to be detected that is available for use. This might decrease the amount of information on an object to be detected available for use in calculation operation of the matching navigation position calculation unit 33B and might decrease accuracy of the calculation result. To cope with this, it is possible to set such that a target TG is arranged in the loading location LPA, or the like, and that information on an object to be detected would be used for a portion including the target TG, even when the portion is included in the mask region MA.

Figure 26:
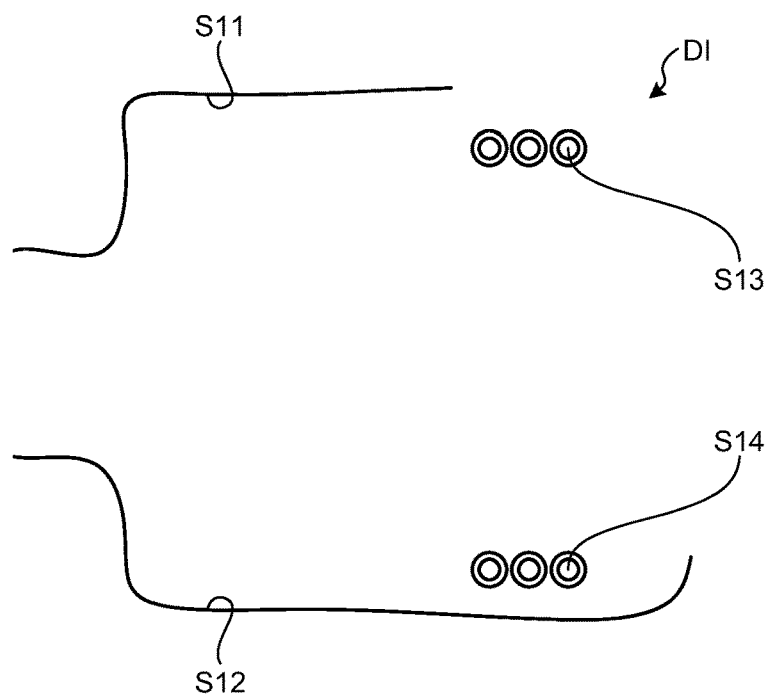
FIG. 26 is a diagram illustrating exemplary detected information.

FIG. 26 is a diagram illustrating information DI on an object to be detected in a case where position detection is performed in an example in FIG. 25. As illustrated in FIG. 26, the information DI on an object to be detected includes information S11 and S12 on an object to be detected regarding the wall portion W outside of the mask region MA and includes information S13 and S14 on an object to be detected regarding the target TG within an arrangement region TA of the target TG. The information DI on an object to be detected does not include the wall portion W and the work machine 4 that are within the mask region MA. In a case where the map information MI is created based on the information DI on an object to be detected, it is possible to use the information S13 and S14 on an object to be detected regarding the target TG although it is not possible to use the information on an object to be detected regarding the wall portion W in the vicinity of the mask region MA. Therefore, in identification operation of the matching navigation position calculation unit 33B, it is possible to calculate the position and azimuth of the dump truck 2 with high accuracy.

Figure 27:
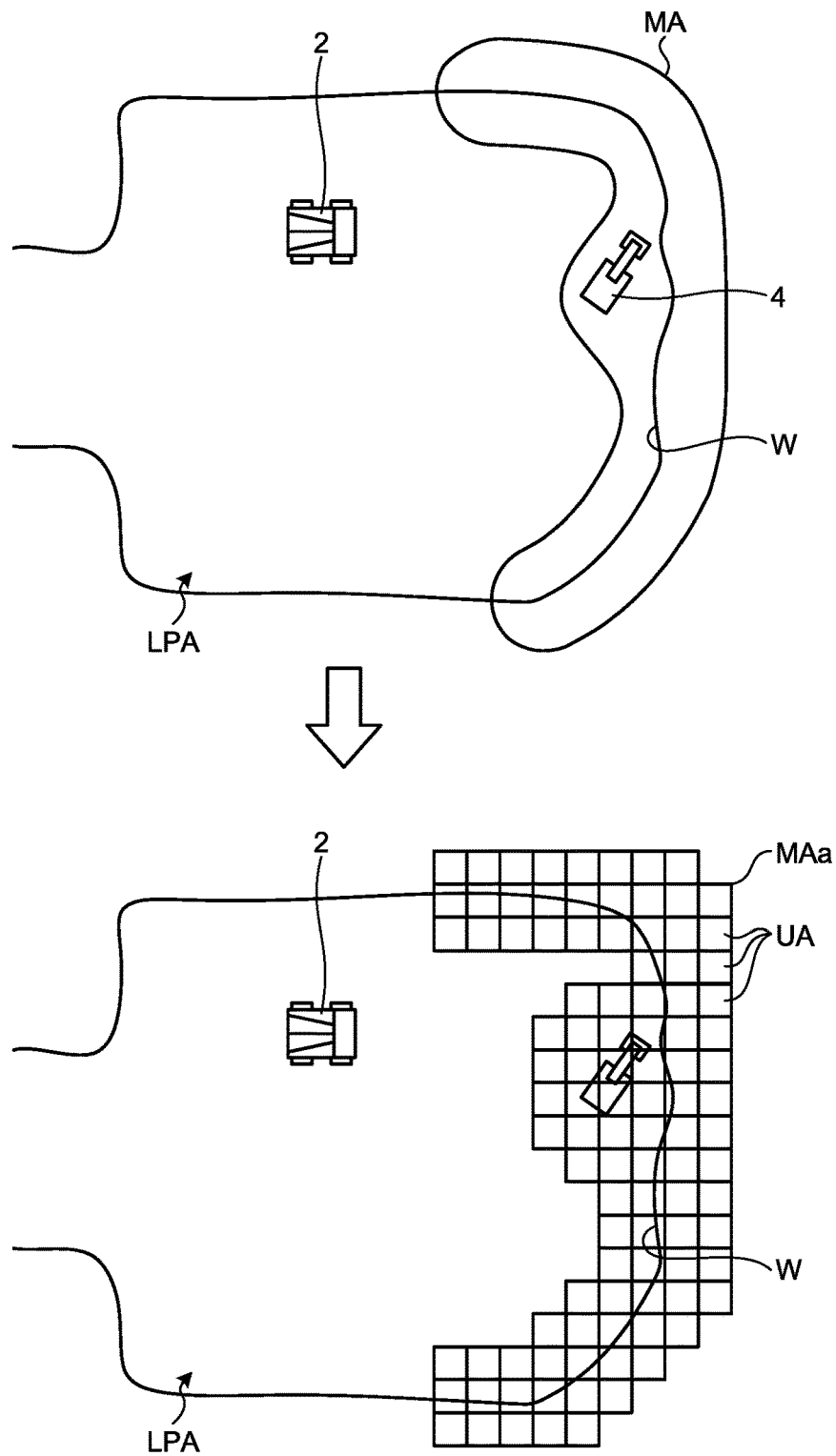
FIG. 27 is a diagram illustrating an exemplary mask region.

The above-described embodiment describes an example in which the mask region MA is set as a region enclosed by a line or a curved line. The configuration, however, is not limited to this. FIG. 27 is a diagram illustrating modification of the mask region MA set in the loading location LPA. As illustrated in FIG. 27, it is possible to configure such that a mask region MAa is set as a region that includes a plurality of unit regions UA segmented into a latticed pattern, and that processing is executed for each of the unit regions UA. With this configuration, inside/outside determination of a laser observation point is further facilitated compared with a case where the setting is performed as a region enclosed by a line or a curved line, making it possible to reduce a calculation cost.

Figure 28:
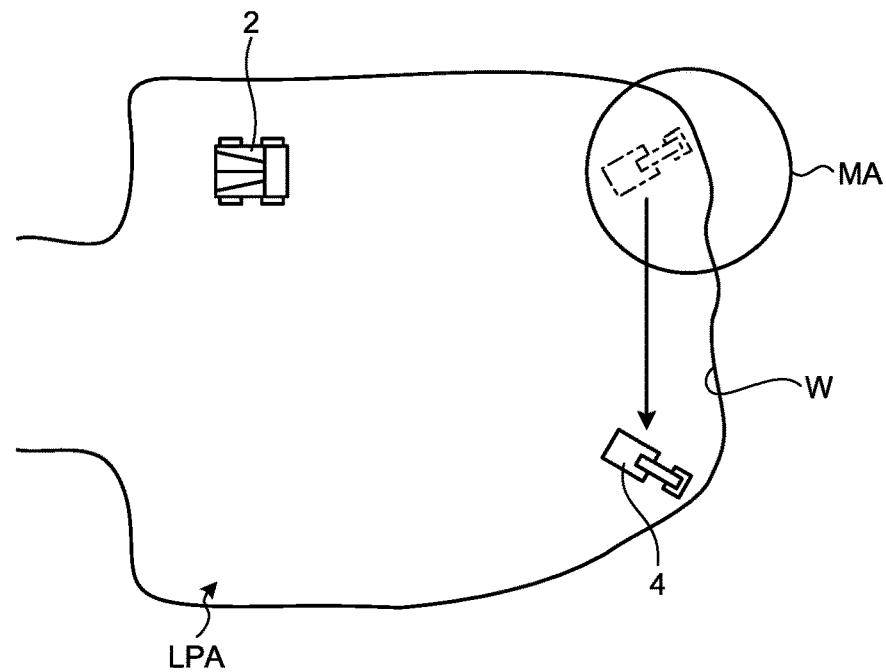
FIG. 28 is a diagram illustrating an exemplary mask region.
Figure 28:
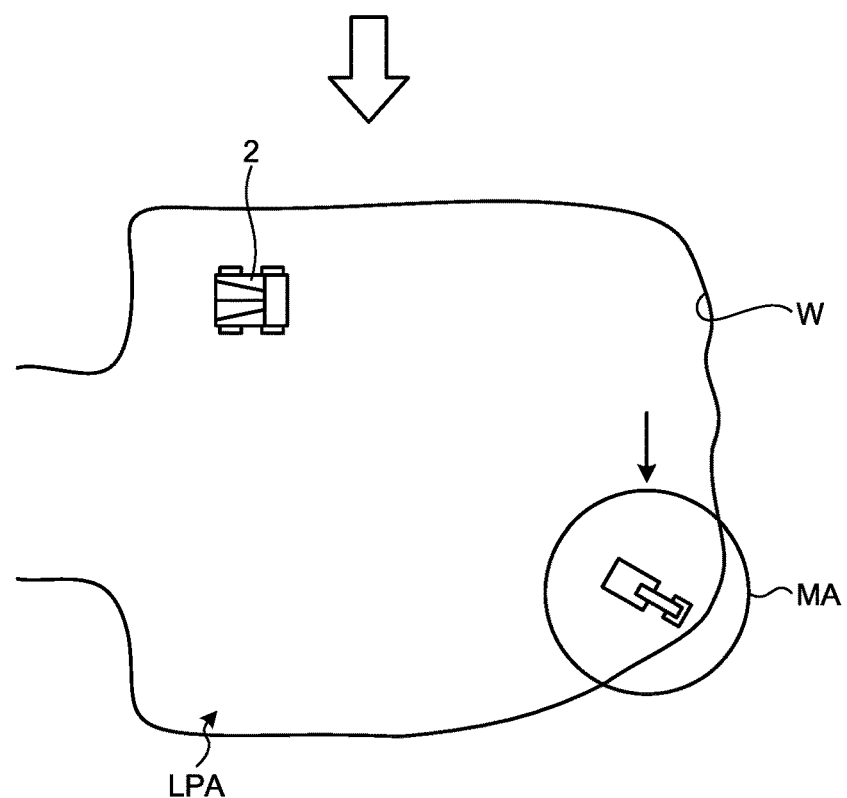

In addition, in the above-described embodiment, it is possible, after setting of the mask region MA, to change the position of the mask region MA or unset the mask region MA. FIG. 28 is a diagram illustrating modification of the mask region MA set in the loading location LPA. As illustrated in FIG. 28, in a case where the work machine 4 moves within the loading location LPA, the position of the wall portion W mined by the work machine 4 also moves. Accordingly, the position of a shape change portion in which the shape changes would move. Accordingly, as illustrated in FIG. 28, it is possible to change the position of the mask region MA corresponding to the position of the work machine 4. In addition, it is possible to configure such that the mask region MA would be unset in a case where operation of the work machine 4 is stopped.

The above-described embodiment describes an example in which the dump truck 2 sets the mask region MA individually. The configuration, however, is not limited to this. For example, it is possible to configure such that, after one dump truck 2 has set/unset the mask region MA, the dump truck 2 transmits the position information on set/unset mask region MA to the management facility 7 as mask region information. It is also possible to cause the management facility 7 to receive the mask region information transmitted from the dump truck 2 and store it in the management device 10. The management facility 7, when it has received the mask region information from each of the dump trucks 2, may update the mask region information to be stored in the management device 10.

Alternatively, it is possible to configure such that the dump truck 2 requests the management facility 7, for example, to transmit position information on the mask region MA every fixed time period, and that, in a case where a request is made from the dump truck 2, the management facility 7 transmits the latest mask region information to the dump truck 2. In this case, the dump truck 2 can set a mask region MA based on the latest mask region information received.

Meanwhile, in a case where the dump truck 2 stops power supply for a fixed period, the dump truck 2 cannot request the management facility 7 to transmit mask region information. Therefore, in this case, it is possible to configure such that the request for the mask region information is made toward the management facility 7 when the power supply of the dump truck 2 is turned on.

Figure 29:
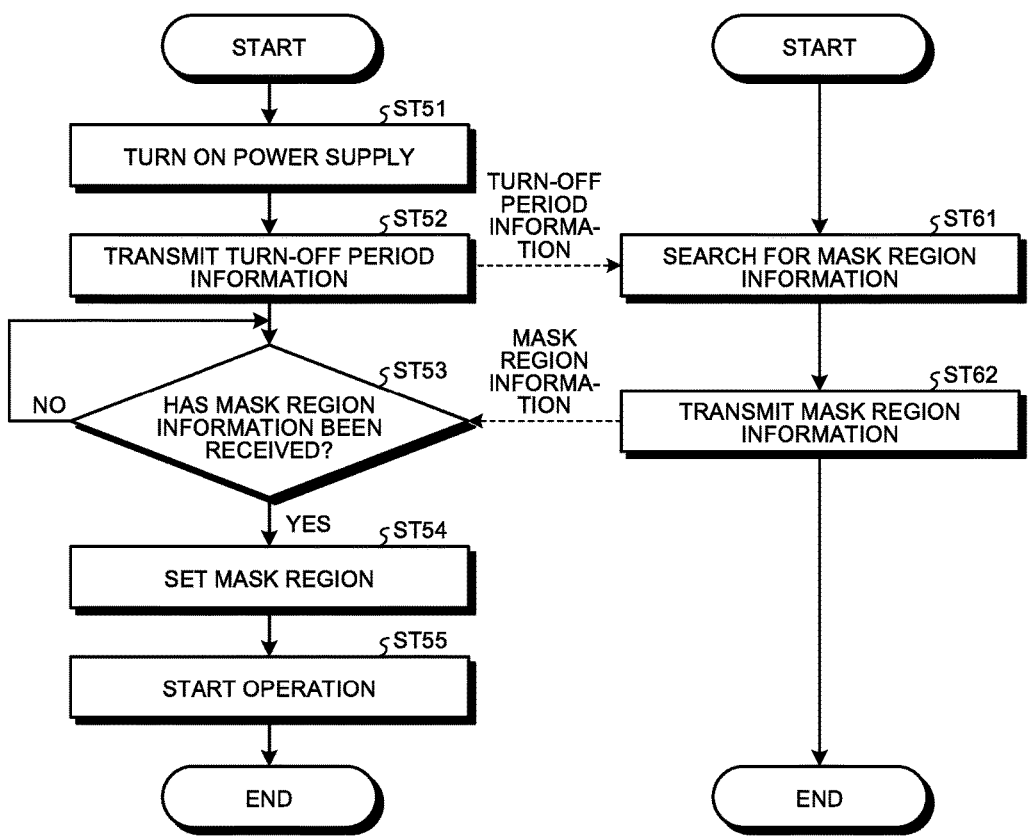
FIG. 29 is a flowchart illustrating exemplary communication operation between a dump truck and a management facility.

FIG. 29 is a flowchart illustrating exemplary communication operation between the dump truck 2 and the management facility 7. As illustrated in FIG. 29, in a case, for example, where the dump truck 2 has turned on the power supply after a fixed time period of turn-off of the power supply (step ST51), the dump truck 2 requests the management facility 7 to transmit mask region information updated during a turn-off period of the power supply (step ST52). In step ST52, the dump truck 2, for example, transmits turn-off period information indicating the turn-off period of the power supply, to the management facility 7. Based on the turn-off period information transmitted from the dump truck 2, the management facility 7 searches for the mask region information updated during the turn-off period of the power supply of the dump truck 2 (step ST61), and transmits the corresponding mask region information to the dump truck 2 (step ST62). The dump truck 2, when it has received the mask region information (step ST53: Yes), sets a mask region MA based on the mask region information (step ST54). Thereafter, the dump truck 2 starts autonomous travel (step ST55). With this configuration, even in a case where the dump truck 2 stops power supply for a fixed period, it is possible to obtain updated information on the mask region MA updated when the power supply is turned on again.

The above-described embodiment describes an example in which the mask region setting unit 51 of the dump truck 2 sets the mask region MA. The setting, however, is not limited to this. For example, the management facility 7 may be configured to set the mask region MA. In this case, it is possible to configure such that information on the set mask region MA is transmitted from the wireless communication device 18 to the dump truck 2. Alternatively, it is possible to configure such that an operator sets the mask region MA manually.

In a case where the management device 7 sets the mask region MA, the processing device 12 may be configured to set the mask region MA according to a site map of a mine. In a case where data of development information is incorporated into the site map, it is possible to configure such that the mask region MA is automatically set toward a terrain change portion. The development information includes, for example, mining location information or transportation path mending scheme information. Alternatively, it is possible to configure such that an operator sets a mask region MA having an optional shape at a desired position using an input device such as a touch panel or a mouse while monitoring on the display device 16.

Alternatively, it is possible to configure such that a processing device, display device, and an input device are provided on a service vehicle or on a dump truck, and that the mask region MA is set by a service person or an operator with a procedure similar to the procedure as described above used by a management facility operator.

REFERENCE SIGNS LIST

S1, S2, S3 POSITION INFORMATION
BK BANK
DI DETECTED INFORMATION
MA, MA1, MA2, MA3, MA4 MASK REGION
HL TRANSPORTATION PATH
MI MAP INFORMATION
IAH, IAV ILLUMINATION RANGE
IS INTERSECTION
DPA DUMPING LOCATION
RP TRAVEL ROUTE
LPA LOADING LOCATION
VP UPWARDLY PROTRUDING OBJECT
1 MANAGEMENT SYSTEM
2 DUMP TRUCK (WORK MACHINE)
7 MANAGEMENT FACILITY
9 COMMUNICATION SYSTEM
10 MANAGEMENT DEVICE
18, 34 WIRELESS COMMUNICATION DEVICE
20 TRAVEL CONTROLLER
24 OBSTACLE SENSOR
24A RADAR (NON-CONTACT SENSOR)
24B LASER SENSOR (NON-CONTACT SENSOR)
30 WORK MACHINE CONTROL SYSTEM
31 GPS RECEIVER (POSITION DETECTION UNIT)
32 TRAVEL ROUTE CREATION DEVICE
33 POSITION MEASUREMENT CONTROLLER (MEASUREMENT OUTPUT UNIT)
33A DETERMINATION UNIT
33B MATCHING NAVIGATION POSITION CALCULATION UNIT
33C GRID MAP CREATION UNIT
36 MAP STORAGE DATABASE
39 OBSERVATION POINT AVAILABILITY JUDGMENT UNIT
51 MASK REGION SETTING UNIT
52 INFORMATION SETTING UNIT

The invention claimed is:

1. A work machine control system configured to control a work machine that travels on a travel route, comprising:
 a position detection unit configured to detect a position of the work machine;
 a non-contact sensor configured to detect a position of an object around the work machine; and
 a control unit configured to extract information on an object to be detected from a detection result of the position detection unit and a detection result of the non-contact sensor and configured to exclude the information on an object to be detected inside a mask region that is set so as to include a terrain change portion that is a portion in which a terrain changes by use of a machine among portions around the travel route.

2. The work machine control system according to claim 1, wherein the information on an object to be detected includes at least one of the detection result of the non-contact sensor and map information generated from a position of an upwardly protruding object that protrudes upwardly among the detection result.

3. The work machine control system according to claim 1, wherein the control system includes a measurement output unit configured to execute: extraction operation that extracts a position of an upwardly protruding object that protrudes upwardly; generation operation that generates, as map information, the position of the upwardly protruding object extracted by the extraction operation; and identification operation that identifies the position of the work machine by matching the detection result of the non-contact sensor against the map information, and
 the measurement output unit uses information excluding a position within the mask region when the measurement output unit executes at least one of the extraction operation, the generation operation, and the identification operation.

4. The work machine control system according to claim 3, wherein the measurement output unit executes at least one of the extraction operation, the generation operation, and the identification operation after the measurement output unit deletes information on an object to be detected within the mask region.

5. The work machine control system according to claim 1, comprising a reception unit configured to receive position-related information regarding the terrain change portion and a position of the machine, transmitted from a management facility a mine,
- wherein the control unit sets the mask region based on the position-related information received by the reception unit.

6. The work machine control system according to claim 1, wherein, in a case where a predetermined target portion is set within the mask region,
- the control unit uses position information on the target portion when the control unit executes the extraction operation, the generation operation, and the calculation operation.

7. The work machine control system according to claim 1,
- wherein the mask region includes a plurality of unit regions segmented into a latticed pattern.

8. A work machine comprising:
- a work machine main body that travels on a travel route in a mine; and
- the work machine control system according to claim 1.

9. A work machine management system, comprising:
- the work machine according to claim 8; and
- a management facility that is provided in a mine and transmits position-related information regarding at least one of a position of a terrain change portion that is a portion in which a terrain changes by use of a machine among portions around the travel route, and a position of the machine,
- wherein the work machine control system receives the position-related information and sets the mask region based on the received position-related information.

10. A work machine control system configured to control a work machine that travels on a travel route, comprising:
- a position detection unit configured to detect a position of the work machine;
- a non-contact sensor configured to detect a position of an object around the work machine; and
- a measurement output unit configured to execute identification operation that identifies the position of the work machine by matching map information against a detection result of the non-contact sensor, the map information being generated based on a detection result of the position detection unit and the detection result of the non-contact sensor,
- wherein when the measurement output unit executes the identification operation, the measurement output unit uses the map information from which a position within a predetermined mask region has been excluded.

11. A work machine comprising:
- a work machine main body that travels on a travel route in a mine; and
- the work machine control system according to claim 10.

12. A work machine management system, comprising:
- the work machine according to claim 11; and
- a management facility that is provided in a mine and transmits position-related information regarding at least one of a position of a terrain change portion that is a portion in which a terrain changes by use of a machine among portions around the travel route, and a position of the machine,
- wherein the work machine control system receives the position-related information and sets the mask region based on the received position-related information.

* * * * *